United States Patent
Kasilya Sudarsan et al.

(10) Patent No.: US 10,565,696 B2
(45) Date of Patent: Feb. 18, 2020

(54) SYSTEMS AND METHODS FOR PRODUCING IMAGE FEEDBACK

(71) Applicant: QUALCOMM Incorporated, San Diego, CA (US)

(72) Inventors: Vishnu Vardhan Kasilya Sudarsan, Bangalore (IN); Sagar Singh, Bangalore (IN); Ganesh Babu Ketti Gangadharan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 15/614,322

(22) Filed: Jun. 5, 2017

(65) Prior Publication Data
US 2018/0350106 A1    Dec. 6, 2018

(51) Int. Cl.
*G06K 9/00* (2006.01)
*G06T 7/00* (2017.01)

(52) U.S. Cl.
CPC ................ *G06T 7/0002* (2013.01)

(58) Field of Classification Search
None
See application file for complete search history.

(56) References Cited

U.S. PATENT DOCUMENTS

| | | | |
|---|---|---|---|
| 7,545,985 B2 | 6/2009 | Zhang et al. | |
| 8,773,731 B2 | 7/2014 | Landa | |
| 9,247,136 B2 | 1/2016 | Emmett et al. | |
| 9,392,163 B2 | 7/2016 | Wu et al. | |
| 2016/0191801 A1 | 6/2016 | Sivan | |
| 2016/0261793 A1* | 9/2016 | Sivan | H04N 19/597 |
| 2018/0278839 A1* | 9/2018 | Sivan | H04N 5/23222 |

* cited by examiner

*Primary Examiner* — Wei Wen Yang
(74) *Attorney, Agent, or Firm* — Austin Rapp & Hardman, P.C.

(57) ABSTRACT

A method performed by an electronic device is described. The method includes determining an image capture mode. The method also includes determining one or more image quality parameter weights based on the image capture mode. The method further includes capturing an image. The method additionally includes determining an image quality score for the image based on the one or more image quality parameter weights. The method also includes providing feedback for the image based on the image quality score.

30 Claims, 13 Drawing Sheets

SYSTEMS AND METHODS FOR PRODUCING IMAGE FEEDBACK

FIELD OF DISCLOSURE

The present disclosure relates generally to electronic devices. More specifically, the present disclosure relates to systems and methods for producing image feedback.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images.

The appearance of images may vary greatly. For example, different images may be captured under a wide variety of different environments and/or circumstances. The environment, circumstance, and/or way in which an image is captured may affect one or more aspects of image appearance.

In some cases, image appearance may be difficult to ascertain. For example, a user may be unable to easily and quickly review images to determine whether an image is a good or a bad image. As can be observed from this discussion, systems and methods that improve image appearance and/or evaluation may be beneficial.

SUMMARY

A method performed by an electronic device is described. The method includes determining an image capture mode. The method also includes determining one or more image quality parameter weights based on the image capture mode. The method further includes capturing an image. The method additionally includes determining an image quality score for the image based on the one or more image quality parameter weights. The method also includes providing feedback for the image based on the image quality score.

Determining the image capture mode may include receiving a mode selection input. Determining the image capture mode may also include selecting a mode from a set of modes based on the mode selection input. The set of modes may include an auto mode, at least one manual mode, and at least one semi-automatic mode.

Determining the one or more image quality parameter weights may include, in a case that the auto mode is selected, selecting a set of equal image quality parameter weights. Determining the one or more image quality parameter weights may also include, in a case that a semi-automatic mode of the at least one semi-automatic mode is selected, selecting a predetermined set of the one or more image quality parameter weights based on the selected semi-automatic mode. Determining the one or more image quality parameter weights may further include, in a case that a manual mode of the at least one manual mode is selected, selecting the one or more image quality parameter weights based on at least one of the selected manual mode or a setting.

The method may include determining one or more image quality parameters based on the selected mode. Determining the one or more image quality parameters based on the selected mode may include, in a case that the auto mode is selected, selecting all image quality parameters. Determining the one or more image quality parameters based on the selected mode may also include, in a case that a semi-automatic mode of the at least one semi-automatic mode is selected, selecting a predetermined set of image quality parameters based on the selected semi-automatic mode. Determining the one or more image quality parameters based on the selected mode may further include, in a case that the manual mode is selected, selecting at least one of the one or more image quality parameters based on at least one of the manual mode or a setting.

Determining the image quality score may include evaluating one or more image property measures. Determining the image quality score may also include calculating an image quality parameter score for each of one or more selected image quality parameters based on at least one of the one or more image property measures. Determining the image quality score may further include calculating the image quality score based on each image quality parameter score and the image quality parameter weights.

Calculating the image quality parameter score for each of the one or more selected image quality parameters may include, for each of the one or more image property measures, determining whether the image property measure is within a target range or a tolerance range and calculating the image quality parameter score based on whether the image property measure is within the target range or the tolerance range. In a case that the image property measure is within the tolerance range, calculating the image quality parameter score may be based on a function that decreases the image quality parameter score as the image property measure departs from the target range.

The method may include determining a score level based on the image quality score. Determining the score level may include determining, from a set of ranges, a range that includes the image quality score and providing the score level corresponding to the determined range.

Providing the feedback may include determining, from a set of feedbacks, the feedback corresponding to the image quality score. Providing the feedback may also include providing the feedback while the electronic device is enabled for image capture.

An electronic device is also described. The electronic device includes a memory and a processor coupled to the memory. The processor is configured to determine an image capture mode. The processor is also configured to determine one or more image quality parameter weights based on the image capture mode. The processor is further configured to capture an image. The processor is additionally configured to determine an image quality score for the image based on the one or more image quality parameter weights. The processor is also configured to provide feedback for the image based on the image quality score.

A non-transitory tangible computer-readable medium storing computer executable code is also described. The computer-readable medium includes code for causing an electronic device to determine an image capture mode. The computer-readable medium also includes code for causing the electronic device to determine one or more image quality parameter weights based on the image capture mode. The computer-readable medium further includes code for causing the electronic device to capture an image. The computer-readable medium additionally includes code for causing the electronic device to determine an image quality score for the image based on the one or more image quality parameter weights. The computer-readable medium also includes code for causing the electronic device to provide feedback for the image based on the image quality score.

An apparatus is also described. The apparatus includes means for determining an image capture mode. The apparatus also includes means for determining one or more image quality parameter weights based on the image capture mode. The apparatus further includes means for capturing an image. The apparatus additionally includes means for determining an image quality score for the image based on the one or more image quality parameter weights. The apparatus also includes means for providing feedback for the image based on the image quality score.

DETAILED DESCRIPTION

The systems and methods disclosed herein may relate to producing image feedback. For example, some configurations of the systems and methods disclosed herein may enable indicating the quality of a photo to a user quickly (e.g., instantly) after capture.

In some approaches, a quality indicator of captured pictures or videos may be sent to an end user. For example, a set of weights may be defined (e.g., predefined) and the quality of the image may be calculated with a final score received from an algorithm (e.g., a final score may be a weighted average of the scores determined from analysis of various image properties).

Factors such as user skill and/or user preference can impact the user experience. For amateur photographers, for example, it may be a mystery why the algorithm considers an image a less desirable one (with a low score). And, for an advanced user, it may be frustrating to see low scores for a well thought-out and composed image. Without providing adaptability (based on user behavior, for example), the quality indicator may be inaccurate and/or may provide a poor user experience.

A scenario where a static (e.g., predefined) algorithm may fail is given as follows. A family may be celebrating a birthday over a candle light setup. The end user may wish to capture the mood of the low light setup. However, when the static algorithm calculates the score based on ideal weights such as exposure and noise, the score may be consistently low due to the difficult light settings. In this case, the end user may consistently get a notification that the image is not up to a quality level. This may fail to benefit the user in this situation.

Figure 3:
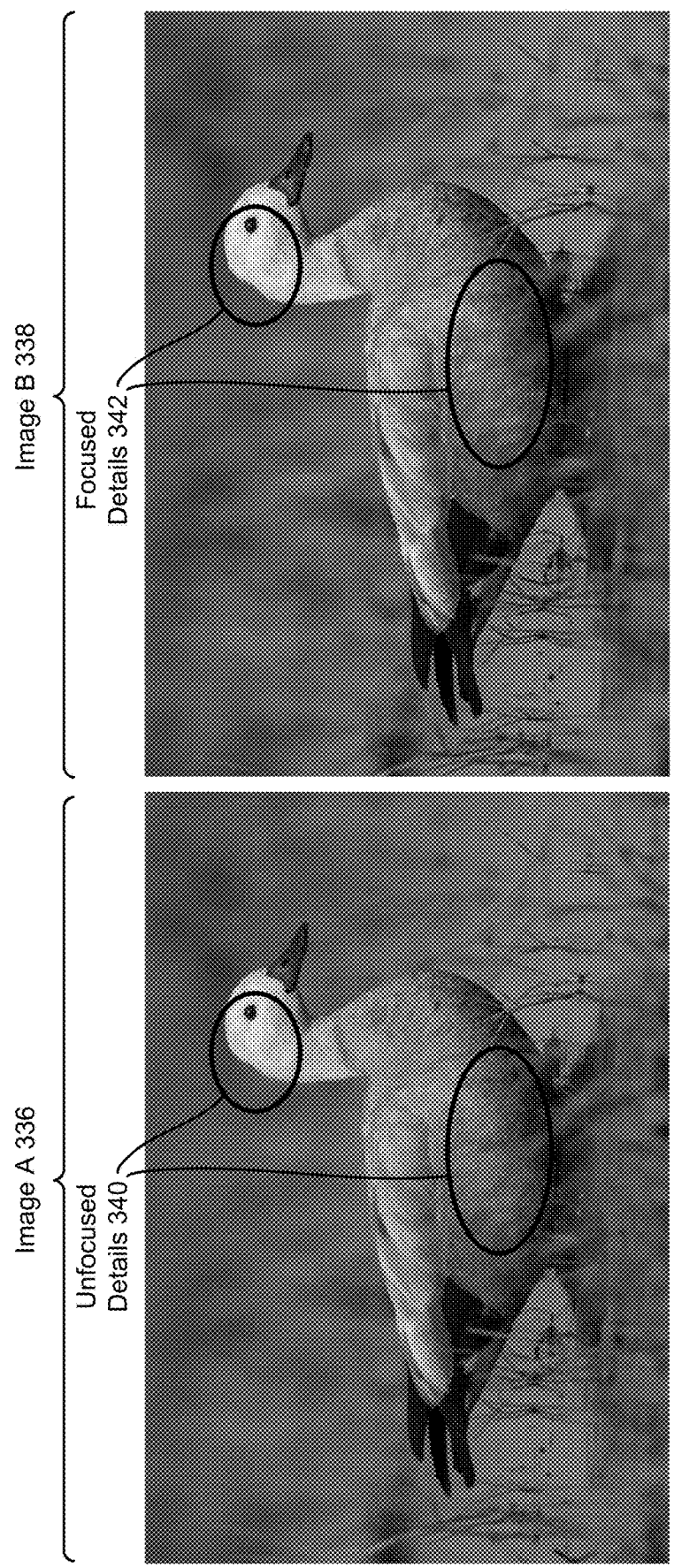
FIG. 3 illustrates an example of an image with unfocused details and an example of an image with focused details.

When an image is captured with a device (e.g., camera, wireless communication device, user equipment (UE), etc.), it is possible that the image might not have been captured with good quality for one or more reasons (e.g., camera shake, object or person movement, closed eyes, lighting or flash issues, blur, etc.). In some approaches, the user may have to open the captured image to confirm whether everything is captured properly. If not, the user may then retake the photo. This creates user inconvenience, since the user may double-check the captured image every time a photo is captured. Additionally or alternatively, important scenery may be missed while rechecking and/or battery may be consumed due to checking the picture quality and then retaking. Example images in FIG. 3 illustrate an example of the differences between a good image (e.g., the image on the right) and a lesser image (e.g., the image on the left) quality with respect to sharpness and blur parameters.

For clarity of description, some terms used herein may be defined as follows. An image quality parameter may be an aspect (e.g., component, characteristic, etc.) of an image that impacts image quality. Examples of image quality parameters may include sharpness, white balance (e.g., automatic white balance (AWB), etc.), color balance, blur, exposure, brightness, phase detection, anti-banding, blinking detection, closed eye detection, red eye detection, noise, contrast, and/or skin tone, etc.

An image quality parameter score may be a numeric value that corresponds to and/or quantifies an image quality parameter for an image. Examples of image quality parameter scores may include a sharpness score, white balance score, color balance score, etc.

An image property measure may be a value (e.g., a numeric value) that quantifies a property of an image. For instance, an image property measure may be calculated based on the pixel values of an image and/or based on one or more settings used to capture the image. Examples of image property measures may include spatial frequency response (SFR), modulation transfer function (MTF), image red component (R), image blue component (B), image green component (G), ratios of image color components (e.g., R/G, B/G), averages of image color components, averages of image color component ratios, lens aperture (e.g., aperture area), shutter speed (and/or time of open shutter), sensitivity (e.g., ISO), image exposure, target exposure, etc. An image property measure may relate to an image quality parameter score. For example, one or more image property measures may be utilized to determine (e.g., calculate, compute, etc.) an image quality parameter score. For instance, a color balance score may be calculated based on one or more image color components.

An image quality parameter weight may be a numeric weighting value that corresponds to and/or weights an image quality parameter score. For example, image quality parameter weights may weight corresponding individual image quality parameter scores in order to determine an image quality score (e.g., an "overall" image quality score).

An image quality score may be an "overall" image quality score that indicates a degree of image quality for an image. For example, an image quality score may be determined (e.g., calculated, computed, etc.) based on a weighted combination of image quality parameter scores.

A score level may be a representation of (e.g., a categorization of) one or more image quality scores (e.g., a range of image quality scores). For example, a score level may serve to map an image quality score to a particular indication of quality, to a particular action, and/or to a particular feedback. For instance, different feedbacks may be provided based on different score levels.

Feedback may be an indication that is provided to a user. For example, feedback may be an output provided by a device indicating image quality that may be perceivable by a user. A wide variety of feedback may be possible in accordance with different configurations of the systems and methods disclosed herein. Examples of feedback may include displaying the image quality score, displaying the score level, displaying an emoticon corresponding to a score level, outputting an audio signal (e.g., speech, tone, etc.) that indicates image quality, tactile feedback (e.g., a short device vibration for a good image quality score, a long device vibration for a poor image quality score, etc.), etc.

It should be noted that some implementations of the systems and methods disclosed herein may include one or more (e.g., one, some, all, or not all) of the concepts expressed by the foregoing terms. For example, some implementations may not utilize the score level and may map the image quality score directly to feedback.

Some configurations of the systems and methods disclosed herein may be implemented in order to address some of these problems. For example, after a device has captured an image with a camera, the image may be processed by one or more algorithms to determine one or more image property measures (e.g., image quality aspects) and produce an image quality score (e.g., a rating from 0% to 100%, a scale of 1-10, and/or another indication) based on one or more image quality parameters (e.g., a set of image quality parameters), such as sharpness, white balance, color balance, blur, exposure, and/or brightness, etc.

After capturing an image, for example, if captured image quality is excellent based on one or more image quality parameters, a high image quality score (e.g., 91% to 100%) may be presented on top of a thumbnail picture (which may be presented in a corner of a camera application, for example). If the captured image quality is good then a medium-high image quality score (e.g., 81% to 90%) may be shown. If the captured image quality is fair, then a medium image quality score (e.g., 61% to 80%) may be shown. If the captured image quality is poor, then a low image quality score (e.g., <=60%) may be shown. An example is provided in connection with FIG. 6. While percentages are given as examples, other forms of ratings may be determined and/or shown (e.g., a rating from 1-10). The image quality score and/or other feedback (e.g., percentage score, score level, symbol, emoticon, emoji, threshold value, tone, sound, speech, message, etc.) may help the user decide whether to take one or more pictures immediately or not and/or may help the user avoid checking the captured photo every time to confirm quality.

In some configurations, one or more modes, options, and/or settings (e.g., image capture mode, manual, automatic (auto), aperture priority, program, portrait, night, low light, action, landscape, panorama, macro, no flash, flash, video, focus, white balance, color balance, aperture, zoom, shutter speed, sensitivity (e.g., International Organization for Standardization (ISO) sensitivity, "ISO," etc.), etc.) may be selected. One or more modes, options, and/or settings may be manual or automatic (e.g., auto or manual focus, auto or manual white balance, auto or manual color balance, auto or manual aperture, auto or manual zoom, auto or manual shutter speed, auto or manual sensitivity, etc.). The one or more modes, options, and/or settings may be selected based on an input (e.g., user input, mode selection input, etc.). For example, a mode selection input may be a user input that indicates a mode for selection. One or more of the modes, options, and/or settings may impact how image quality is measured and/or determined. In some configurations, a "mode" may include or be associated with one or more settings. For example, an auto mode may include predetermined color balance, aperture, and shutter speed settings.

A "setting" for image capture may be a factor that impacts how an image is captured. Examples of settings for image capture may include aperture setting, flash setting, focus setting, white balance setting, color balance setting, shutter speed setting, aperture setting, and/or sensitivity (e.g., ISO) setting, etc.

Some configurations of the systems and methods disclosed herein may take into account the capture mode and/or the manual or semi-automatic input parameters selected by the user prior to the image capture. Weights may be set based on the inputs. Some configurations may provide quick feedback in terms of a user interface (UI) graphical notification to indicate image quality while taking user preferences into account.

Some configurations may cover all classes of image quality parameters using two or more categories of weighting mechanisms for quality scoring. For example, a beginner camera user may select a predefined or semi-automatic mode according to the scene prior to image capture. The image quality parameter weights may be defined by the image processing algorithm to score image quality. For instance, for a selected night mode, the weights may be automatically adjusted to give very low weight to exposure, so the overall score will be impacted less by the exposure parameter. Experienced and/or advanced users may manually include parameter(s) and/or weight(s), modify weight(s), and/or exclude parameter(s). The weights may be adjusted accordingly to give control to the user to define the set of parameters that should be included to calculate image quality.

In one example, if an aperture option is selected to introduce blur in the background for out-of-focus images (see FIG. 4, for instance), some configurations of the systems and methods (e.g., device and/or algorithm) may be intelligent enough to ignore parameters like sharpness and/or exposure, because the captured photo may have a sharpness issue and/or an exposure issue. Additionally or alternatively, whenever one or more camera feature options are manually selected to capture photos that may affect one or more parameters, those parameters may be ignored and/or weighted for processing and rating.

In some approaches, one or more image property measures may be calculated based on one or more algorithms. For example, one or more image processing algorithms may be utilized for processing the image(s) and providing the image property measure(s) and/or values for determining image quality parameter score(s). In some configurations, an algorithm may be utilized to detect if a person's eye(s) are closed in a captured image. The detection may be utilized to determine one or more image property measures and/or one or more image quality parameter scores. In some approaches, providing feedback may include presenting a symbol (e.g., emoticon) that indicates whether one or more eyes are closed in the image.

In some approaches (after image processing and/or determining one or more image property measures, for example), if the image property measure does not fall within one or more ranges (e.g., a passing case range), the image property and/or one or more image quality parameter scores based on the image property measure may be considered a failure. In some examples, one or more image property measures and/or one or more image quality parameters may have one or more corresponding pass ranges and/or failure ranges. Additionally or alternatively, an image quality score (e.g., an overall score) may be calculated by averaging multiple image quality parameter scores and/or by determining a difference between configured default values.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
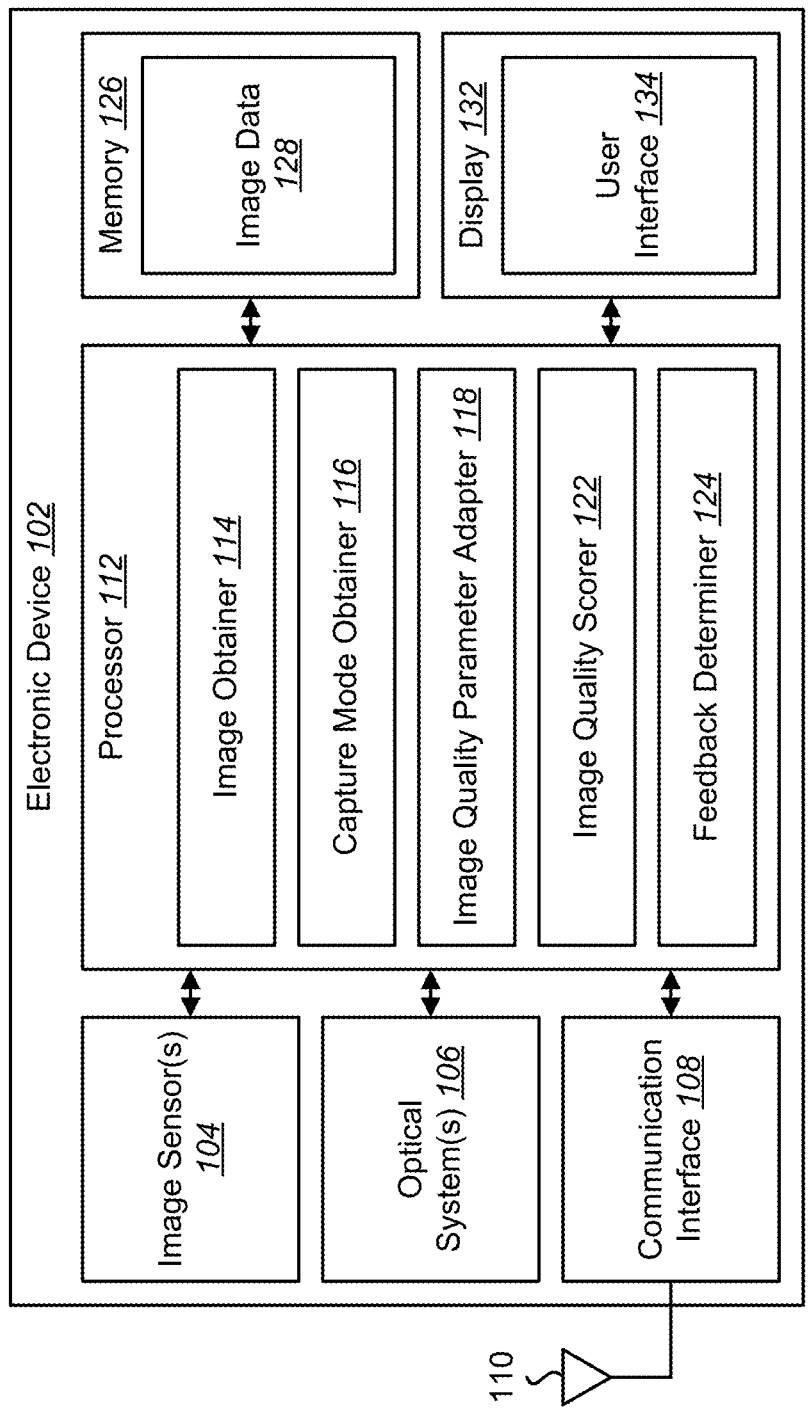
FIG. 1 is a block diagram illustrating one example of an electronic device in which systems and methods for producing image feedback may be implemented.

FIG. 1 is a block diagram illustrating one example of an electronic device 102 in which systems and methods for producing image feedback may be implemented. Examples of the electronic device 102 may include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to an input device (e.g., mouse) and may detect inputs (e.g., a mouse click). In some configurations, one or more of the images described herein may be presented on the display 132 and/or user interface 134. In some configurations, the electronic device 102 may include and/or be coupled to additional or alternative input devices. For example, the electronic device 102 may include one or more buttons, knobs, dials, wheels, switches, touch pads, microphones, pressure sensors, fingerprint readers, temperature sensors, etc., that may be utilized to receive input. For instance, the electronic device 102 may include a knob for selecting an image capture mode and/or a button for initiating an image capture in some configurations. Other configurations may be implemented.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, wide-angle images, telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle images, telephoto images, etc.). In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smartphone camera, etc.). In some configurations, the electronic device 102 may request and/or receive the one or more images via the communication interface 108. For example, the electronic device 102 may or may not include a camera (e.g., an image sensor 104 and/or optical system 106) and may receive images from one or more external (e.g., remote) devices.

The memory 126 may store instructions and/or data. The processor 112 may access (e.g., read from and/or write to) the memory 126. Examples of instructions and/or data that may be stored by the memory 126 may include image data 128, image capture mode, settings, image obtainer 114 instructions, capture mode obtainer 116 instructions, image quality parameter adapter 118 instructions, image quality scorer 122 instructions, feedback determiner 124 instructions, and/or instructions for other elements, etc.

In some configurations, the electronic device 102 (e.g., the memory 126) may include an image data buffer (not shown). The image data buffer may buffer (e.g., store) image data (e.g., one or more images, image frame(s), etc.) from the image sensor 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more still images, one or more burst frames, and/or one or more video frames, etc. It should be noted that the systems and methods disclosed herein may be applied to one or more images and/or to one or more of a series of images (e.g., a video stream, burst images, etc.). In some configurations, the camera software application and/or the display 132 may display (e.g., present, output, etc.) image quality feedback (e.g., an image quality score and/or information about a specific issue, etc.).

The processor 112 may include and/or implement an image obtainer 114, a capture mode obtainer 116, an image quality parameter adapter 118, an image quality scorer 122, and/or a feedback determiner 124. It should be noted that one or more of the elements illustrated in the electronic device 102 and/or processor 112 may be optional. For example, the image quality parameter adapter 118, the image quality scorer 122, and/or the feedback determiner 124 may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 and/or may be captured from one or more remote camera(s). In some configurations, the image obtainer 114 may obtain multiple images.

In some configurations, the image obtainer 114 may request and/or receive one or more images (e.g., image frames, burst images, video, etc.). For example, the image obtainer 114 may request and/or receive one or more images from a remote device (e.g., external camera(s), remote server, remote electronic device, etc.) via the communication interface 108.

The processor 112 may include and/or implement a capture mode obtainer 116. The capture mode obtainer 116 may obtain (e.g., determine, select, receive, etc.) an image capture mode. In some configurations, the capture mode obtainer 116 may obtain a mode indicator from the user interface 134. For example, the user interface 134 may receive a capture mode indication input (e.g., a user input), which may be provided to the capture mode obtainer 116. For instance, the user interface 134 may detect a touch input (on a touchscreen, for example) indicating a capture mode. Additionally or alternatively, the electronic device 102 may include and/or be coupled to one or more other input devices (e.g., one or more buttons, knobs, dials, wheels, switches, touch pads, mice, touchscreens, microphones, pressure sensors, temperature sensors, etc.). One or more of the input devices may detect or receive a capture mode indication input (e.g., an input indicating a capture mode). For example, a dial may be turned to a particular position to indicate a capture mode, a button may be pressed (one or more times, for instance) to indicate a capture mode, a microphone may receive a speech signal indicating a capture mode, a camera and/or light sensor may capture information indicating a capture mode, etc. The electronic device 102 (e.g., capture mode obtainer 116) may obtain the input from the one or more input devices and/or may interpret the input to determine a capture mode. For example, the electronic device 102 (e.g., capture mode obtainer 116) may interpret a number of button presses to select a capture mode, may perform speech recognition to select a capture mode, may interpret a dial position to select a capture mode, etc.

In some configurations, the image capture mode may be determined from a set of image capture modes. For example, the image capture mode may be selected from an automatic (auto) capture mode, a manual capture mode, and/or a semi-automatic capture mode. In the automatic capture mode, the electronic device 102 may automatically detect and/or manage settings for image capture. For example, the electronic device 102 (e.g., processor 112, image signal processor (ISP), etc.) may automatically determine an aperture setting, flash setting, focus setting, white balance setting, color balance setting, shutter speed setting, aperture setting, and/or sensitivity (e.g., ISO) setting, etc. For example, in auto capture mode, all settings may be determined automatically.

In a manual capture mode, the electronic device 102 may utilize one or more manual settings for image capture. For example, the electronic device 102 (e.g., processor 112, ISP, etc.) may utilize a manual aperture setting, manual flash setting, manual focus setting, manual white balance setting, manual color balance setting, manual shutter speed setting, and/or manual sensitivity (e.g., ISO) setting, etc. Some examples of manual mode may include a full manual mode (which may allow manual settings for shutter speed, aperture, and/or sensitivity, which may allow manual settings for all adjustable image capture settings, etc., for instance), a program mode (which may provide automatic exposure and allow one or more manual settings), an aperture priority mode (which may allow manual setting of aperture and/or sensitivity), and/or a shutter priority mode (which may allow manually setting of shutter speed and/or sensitivity). It should be noted that one or more settings in manual mode may be manually set (based on input, for example). Some manual modes may allow one or more automatic settings while including at least one manual setting. In some configurations, one or more settings in manual mode may be default settings initially (e.g., may be set to initial default values and/or may allow manual adjustment). In a semi-automatic capture mode, the electronic device 102 may utilize a set of predetermined settings. Examples of semi-automatic capture modes may include action mode, landscape mode, macro mode, night (and/or low-light) mode, etc. For instance, action mode may utilize a set of predetermined settings that are different from a set of predetermined settings for landscape mode. In some configurations, semi-automatic mode settings may not be modifiable. For example, the electronic device 102 may need to switch to a manual mode to modify one or more settings.

It should be noted that aperture priority mode, shutter priority mode, and program mode may be referred to as "semi-manual" modes, since aperture priority mode, shutter priority mode, and program mode may allow for manual adjustment of one or more settings while providing automatic determination of one or more other settings. In some configurations, one or more "semi-manual" modes may be designated as semi-automatic modes (e.g., included in the set of semi-automatic modes) as described herein. In configurations where a "semi-manual" mode is considered to be a semi-automatic mode as described herein, all corresponding image quality parameter(s) and/or image quality parameter weight(s) may be automatically determined (e.g., predetermined) in a case that the semi-manual mode is selected. For example, one or more "semi-manual" modes may not allow changing an image quality parameter set and/or an image quality parameter weight determination from predetermined values in some configurations. Accordingly, a semi-manual mode may not impact the scoring or weighting mechanisms (whether or not one or more manual adjustments are made, for example) in some approaches.

In some configurations, one or more "semi-manual" modes may be designated as manual modes (e.g., included in a set of manual modes). In configurations where a "semi-manual" mode is considered to be a manual mode as described herein, one or more corresponding image quality parameters and/or one or more image quality parameter weights may be manually adjustable and/or may be automatically determined based on manual adjustment of corresponding setting(s) in a case that the semi-manual mode is selected. Accordingly, some configurations of the systems and methods disclosed herein may include one or more semi-manual modes as semi-automatic modes, while other configurations of the systems and methods disclosed herein may include one or more semi-manual modes as manual modes.

In some configurations, the semi-automatic mode(s) may include one or more semi-automatic "scene" modes (e.g., night mode, low light mode, action mode, sport mode, portrait mode, landscape mode, etc.), where all settings are automatically determined (e.g., predetermined) based on the mode. For semi-automatic "scene" modes, for example, certain image quality parameter(s) and/or image quality parameter weight(s) may be considered or ignored based on the type of scene (e.g., based on the semi-automatic mode selection). For example, setting an image capture mode to a semi-automatic scene mode "Sport" may automatically give priority to shutter speed. An image capture mode "Night Scene" may automatically set aperture as priority.

The manual mode(s) may include a full manual mode, where all accessible settings may be manually adjustable. In some configurations of manual mode, one or more (e.g., some or all) image quality parameters may be manually selectable/de-selectable and/or one or more (e.g., some or all) image quality parameter weights may be manually modifiable (e.g., adjustable).

The processor 112 may include and/or implement an image quality parameter adapter 118. The image quality parameter adapter 118 may adapt one or more image quality parameters (e.g., select one or more image quality parameters, ignore one or more image quality parameters, include one or more image quality parameters, exclude one or more image quality parameters, and/or determine one or more image quality parameter weights, etc.) based on the image capture mode.

In some configurations, image quality parameters are aspects (e.g., components, characteristics, etc.) of an image. Examples of image quality parameters may include sharpness, white balance (e.g., automatic white balance (AWB), etc.), color balance, blur, exposure, brightness, phase detection, anti-banding, blinking detection, closed eye detection, red eye detection, noise, contrast, and/or skin tone, etc. In some configurations, one or more image quality parameter scores may be calculated corresponding to one or more image quality parameters.

In some approaches, a sharpness score may be measured based on a spatial frequency response (SFR) and/or a modulation transfer function (MTF). Color balance (and/or white balance) may be used to compensate for the influence of illuminant on the scene. The human eye is adept to adjusting for lighting conditions, where white color resembles white regardless of the effect of various sources. Imaging systems may have auto color balancing capability, but may fail in difficult lighting conditions. Image exposure may indicate how light or dark an image will appear when it is captured by a photographic system. Aperture, sensitivity (e.g., ISO), and/or shutter speed may be utilized to determine the exposure of an image. It should be noted that color balance and white balance may be closely related but not the same. For example, white balance may indicate (to a camera, for example) that something (e.g., an object in a field of view) is "white." Shooting under office lights, a camera may inaccurately determine that something is not "white" and may end up producing a warm tone (with greens and/or yellows, for example) in the image. Color balance may be an overall color shift mechanism to achieve the required color tones. Color balance and/or white balance (e.g., an image quality parameter for color balance and/or an image quality parameter for white balance) may be utilized jointly (e.g., together) or separately (e.g., independently and/or exclusively) in some configurations of the systems and methods disclosed herein.

In some configurations, the image quality parameter adapter 118 may select one or more image quality parameters based on the image capture mode. For example, the image quality parameter adapter 118 may select all image quality parameters in a case that the image capture mode is automatic (e.g., "auto").

In a case that a semi-automatic mode is selected, the image quality parameter adapter 118 may select a predetermined set of image quality parameters based on the selected semi-automatic mode. For example, each semi-automatic mode may include a corresponding set of one or more image quality parameters. The predetermined set may exclude one or more image quality parameters that may be adversely affected by the semi-automatic mode. For a night (e.g., low-light) semi-automatic mode, for example, the predetermined set may exclude white balance and/or color balance. A portrait semi-automatic mode, for example, may include a closed eye detection image quality parameter. Additionally or alternatively, one or more image quality parameter weights may be determined (increased or decreased, for instance) based on the selected semi-automatic mode.

Table (1) provides some examples of semi-automatic modes with corresponding image quality parameters. For instance, Table (1) provides some examples of a weighting mechanism for some semi-automatic modes. The corresponding image quality parameters may have one or more increased image quality parameter weights, one or more decreased image quality parameter weights, and/or one or more excluded image quality parameter weights. Additionally or alternatively, one or more of the corresponding image quality parameters may be excluded from image quality score calculation.

reduced impact. Additionally or alternatively, excluding an image quality parameter may increase the weight of the other (e.g., remaining) image quality parameter weight(s), since the other image quality parameter weight(s) will have a greater impact on the image quality score.

It should be noted that a "decreased" (or "low") image quality parameter weight may indicate that the image quality parameter weight is less than an equal image quality parameter weight (e.g., less than the image quality parameter weight at equilibrium or when all weights are equal), where all image quality parameters are included (e.g., all image quality parameters implemented). For example, a decreased image quality parameter weight may have less weight in comparison with a corresponding image quality parameter weight in the automatic mode. Additionally or alternatively, a "decreased" image quality parameter weight may be less than a predetermined (e.g., default) value or previous value for the image quality parameter weight.

In a case that a manual mode is selected, the image quality parameter adapter 118 may select one or more image quality parameters. In some approaches, the image quality parameter adapter 118 may select the image quality parameter(s) based on an input. For example, the electronic device 102 (e.g., image quality parameter adapter 118) may obtain (e.g., receive) an input (e.g., a user input) that indicates a manual selection of the one or more image quality parameters. For

TABLE (1)

| Semi Auto Mode | Increased Image Quality Parameter Weight(s) for Image Quality Score Determination | Decreased or Excluded Image Quality Parameter(s)/Weight(s) for Image Quality Score Determination |
|---|---|---|
| Portrait | Color Balance and/or White Balance, Skin Tone, Exposure | Sharpness, Noise |
| Night Portrait | Color Balance and/or White Balance, Skin tone, Red Eye, Anti-Banding | Sharpness, Noise, Exposure |
| Landscape | Sharpness, Color Balance, Exposure | Skin Tone, Noise |
| Sport | Sharpness, Brightness | Color Balance and/or White Balance, Noise |
| Night Scene | Sharpness, Noise, Anti-Banding | Exposure, Skin Tone, Color Balance and/or White Balance |
| Macro | Brightness, Color Balance, and/or White Balance | Sharpness, Noise |
| Sunset | Color Balance and/or White Balance, Noise | Exposure, Sharpness |
| Silhouette | Sharpness, Noise | Exposure, Color Balance and/or White Balance |

It should be noted that an "increased" (or "high") image quality parameter weight may indicate that the image quality parameter weight is greater than an equal image quality parameter weight (e.g., greater than the image quality parameter weight at equilibrium or when all weights are equal), where all image quality parameters are included (e.g., all image quality parameters implemented). For example, an increased image quality parameter weight may have greater weight in comparison with a corresponding image quality parameter weight in the automatic mode. Additionally or alternatively, an "increased" image quality parameter weight may be greater than a predetermined (e.g., default) value or previous value for the image quality parameter weight. It should be noted that reducing an image quality parameter weight for one or more image quality parameters may increase the image quality parameter weight for one or more other image quality parameters, since the other image quality parameter(s) may have an increased impact on the image quality score, while the one or more image quality parameters with reduced weights may have a low-light scene, for example, the electronic device 102 (e.g., image quality parameter adapter 118) may receive an input indicating a directive to exclude sharpness. Additionally or alternatively, the image quality parameter adapter 118 may select (e.g., automatically select) one or more image quality parameters based on the manual mode and/or settings (e.g., manual mode settings). For example, the image quality parameter adapter 118 may exclude sharpness and exposure in a case that an aperture priority mode is selected. Additionally or alternatively, the image quality parameter adapter 118 may select (e.g., automatically select) one or more image quality parameters based on manual mode settings. For example, if a user manually sets an aperture setting that will likely blur the background, the image quality parameter adapter 118 may exclude sharpness and/or exposure. In some configurations, a manual image quality parameter selection may override an automatic image quality parameter selection. Accordingly, the image quality parameter adapter 118 may provide automatic and/or manual selection of one or more image quality parameters for manual mode.

In some configurations, the image quality parameter adapter 118 may determine one or more image quality parameter weights based on the image capture mode. In a case that a manual mode is selected, the image quality parameter adapter 118 may select one or more image quality parameter weights. In some approaches, the image quality parameter adapter 118 may select the image quality parameter weight(s) based on an input. For example, the electronic device 102 (e.g., image quality parameter adapter 118) may obtain (e.g., receive) an input (e.g., a user input) that indicates a manual selection (e.g., value(s)) of the one or more image quality parameter weights. For instance, the electronic device 102 (e.g., image quality parameter adapter 118) may receive an input indicating that the sharpness weight should be 0.25. Additionally or alternatively, the image quality parameter adapter 118 may select (e.g., automatically select) one or more image quality parameter weights based on the manual mode and/or one or more settings (e.g., manual mode settings). For example, the image quality parameter adapter 118 may reduce a sharpness weight and an exposure weight to zero in a case that an aperture priority mode is selected. Additionally or alternatively, the image quality parameter adapter 118 may select (e.g., automatically select) one or more image quality parameter weights based on one or more manual mode settings. For example, if a user manually sets an aperture setting that will likely blur the background, the image quality parameter adapter 118 may reduce a sharpness weight and/or exposure weight to zero. In some configurations, a manual image quality parameter weight selection may override an automatic image quality parameter weight selection. Accordingly, the image quality parameter adapter 118 may provide automatic and/or manual selection of one or more image quality parameter weights for manual mode.

Manual mode (e.g., a full manual mode) may be suitable for advanced users. When in manual mode, the user may be enabled to define weights (e.g., one or more individual weights) per their knowledge of the scene and/or to ignore one or more of the image quality parameter scores in the weighted calculation. For a very low light scene, for example, a user may want to emphasize sharpness and exposure, and may want to ignore white balance and/or color balance completely. Additionally or alternatively, for the same low light scene, a user might think that based on the current light settings, he or she may not get an appropriate sharpness as desired and may choose to ignore the sharpness image quality parameter score completely. Accordingly, the systems and methods disclosed herein may give ample flexibility to each user to set (e.g., adjust, tailor, etc.) the scoring approach.

In a case that a semi-automatic mode is selected, the image quality parameter adapter 118 may select a predetermined set of image quality parameter weights based on the selected semi-automatic mode. For example, each semi-automatic mode may include a corresponding set of one or more image quality parameter weights. The predetermined set may set one or more image quality parameter weights to predetermined values. In some configurations, one or more image quality parameter weights may be reduced or set to zero for one or more image quality parameters that may be adversely affected by the semi-automatic mode. For a night (e.g., low-light) semi-automatic mode, for example, the predetermined set may set a white balance and/or color balance weight to zero.

Semi-automatic mode may be suitable for intermediate users. For example, users who want to spend less time in manual settings but still want to enable optimal settings may choose from a set of predefined scene modes of image quality measurements. For example, on a fairly sunny outdoor day, a user may want to completely ignore an exposure score, since there may be a low probability (e.g., minimal or no chance) of low exposure images. Emphasizing primarily color balance, which may often exhibit problems on overcast days, and also emphasizing sharpness may be beneficial in this scenario. In some configurations of the systems and methods disclosed herein, the sunny mode may be selected, which may automatically have less weighting for the exposure score and/or may have high weighting for white balance and sharpness.

In some configurations, the image quality parameter adapter 118 may select a set of equal image quality parameter weights (e.g., equally weight all image quality parameters) in a case that the image capture mode is automatic (e.g., "auto"). In some configurations, the image quality parameter adapter 118 may select a predetermined (e.g., default) but unequal set of image quality parameter weights in a case the image capture mode is automatic. Auto mode may be suitable for beginning photographers. In auto mode, for instance, the electronic device 102 (e.g., algorithm) may calculate the image quality parameter scores for all parameters (e.g., two or more of the image quality parameters described herein) based on the captured image and may assign equal weights to produce a weighted average. In auto mode, for example, weights $w_1 \ldots w_n = 1$.

In some configurations, the electronic device 102 (e.g., processor 112, capture mode obtainer 116, image quality parameter adapter 118, etc.) may determine a capture mode and/or determine one or more corresponding values (e.g., image quality parameter(s), image quality parameter weight(s), etc.) in a particular order. For example, the electronic device 102 may first determine whether a manual mode is selected, followed by determining whether a semi-automatic mode is selected, followed by determining whether an auto mode is selected. Additionally or alternatively, the electronic device 102 may determine an image quality parameter selection and/or image quality parameter weight(s) for manual mode first (if selected, for example), or corresponding values for semi-automatic mode next (if selected, for example), or corresponding values for auto mode next (if selected, for example). Other orders may be implemented. In some configurations, the mode selection determination may be determined for multiple modes concurrently. Additionally or alternatively, corresponding values (e.g., image quality parameter selection and/or image quality parameter weight(s)) may be determined concurrently.

In some configurations, image quality parameter selection and image quality parameter weight selection may be performed jointly. For example, determining the image quality parameter weight(s) may determine the image quality parameter selection. For instance, the image quality parameter weight selection may be performed (based on the image capture mode and/or one or more manual inputs). The image quality parameter weight selection may determine (e.g., imply) the image quality parameter selection due to the weights. For example, setting an image quality parameter weight to zero may be one example of not selecting (e.g., ignoring) the corresponding image quality parameter.

In some approaches, one or more image property measures corresponding to the image quality parameter may be evaluated regardless of weight. Then, any image quality parameter score with a weight of zero may have no effect on the image quality score (e.g., overall score), thereby not selecting (e.g., ignoring) the corresponding image quality parameter(s). Additionally or alternatively, any image quality parameter with a non-zero weight may be selected.

In some approaches, one or more image property measures and/or image quality parameter scores corresponding to an unselected image quality parameter may not be determined, evaluated, and/or calculated. For example, if a particular image quality parameter is not selected, then one or more corresponding image property measures and/or one or more corresponding image quality parameter scores may not be calculated. This may save processing bandwidth in cases where one or more image quality parameter scores are to be ignored and/or excluded. In other approaches, all image property measures and/or image quality parameter scores may be calculated regardless of whether each image quality parameter is selected or not.

In some configurations, image quality parameter selection and image quality parameter weight selection may be performed separately. In some approaches, image quality parameter selection and image quality parameter weight selection may be performed independently. For example, image quality parameter selection may be performed without regard to image quality parameter weight selection and vice versa.

In some approaches, image quality parameter weight selection may depend on image quality parameter selection. For example, one or more image quality parameter weights may be excluded (e.g., excluded from image quality score determination, not utilized, excluded from image quality score formulation, etc.) that correspond to one or more unselected image quality parameters. For instance, the unselected image quality parameter(s) and corresponding image quality parameter weight(s) may not be included as a factor in the image quality score calculation (e.g., not even included as a zero value).

In some approaches, image quality parameter selection may depend on image quality parameter weight selection. For example, one or more image quality parameters may be excluded (e.g., excluded from image quality score determination, not utilized, excluded from image quality score formulation, etc.) that correspond to one or more image quality parameter weights with a value of zero. For instance, the image quality parameter weight(s) and corresponding image quality parameter(s) may not be included as a factor in the image quality score calculation (e.g., not even included as a zero value). Additionally or alternatively, one or more image quality parameters may be included (e.g., included in image quality score determination, utilized, included in image quality score formulation, etc.) that correspond to one or more image quality parameter weights with a non-zero value.

In some configurations, the processor 112 may include and/or implement an image quality scorer 122. The image quality scorer 122 may determine an image quality score. The image quality score may be an overall score or a "final" score for an image. For example, the image quality score may be based on one or more image quality parameters (e.g., the one or more selected image quality parameters), one or more image quality parameter weights (e.g., the one or more image quality parameter weights), and/or one or more image property measures. For example, the image quality score may be calculated based on two or more image quality parameters (e.g., image quality parameter scores). The image quality parameters may include, but may not be limited to sharpness, color balance, and/or exposure. In some configurations, the image quality score may be determined (e.g., calculated, computed, evaluated, etc.) as an average (e.g., weighted average) of image quality parameter scores.

In some approaches, determining the image quality score may include evaluating (e.g., calculating, computing, etc.) one or more image property measures. For example, the image quality scorer 122 may evaluate the one or more image property measures. An image property measure may be a measure of an image property. Examples of image property measures include spatial frequency response (SFR), modulation transfer function (MTF), image red component (R), image blue component (B), image green component (G), ratios of image color components (e.g., R/G, B/G), averages of image color components, averages of image color component ratios, lens aperture (e.g., aperture area), shutter speed (and/or time of open shutter), sensitivity (e.g., ISO), image exposure, target exposure, etc.

The SFR or MTF may be a contrast at a given spatial frequency (which may be measured in cycles or line pairs per distance) relative to low frequencies. For example, the 50% MTF frequency may correlate with perceived sharpness. An SFR measure within a range (e.g., 1.0 to 1.1) may be a target range for an image to be considered sharp. SFR or MTF may be utilized to determine a sharpness score.

A color component may refer to a color component of one or more pixels. For example, each pixel of an image may have three color components (e.g., red, green, and blue). In some approaches, the image quality scorer 122 may sum each of the pixel color components in an image to determine image color components (e.g., R, G, and/or B) Image color component ratios (e.g., (R/G) and/or (B/G)) may be determined (e.g., calculated, computed, evaluated, etc.) for an entire image. An average of the image color component ratios (e.g., a scene average of (R/G) and (B/G)) may also be determined. A range (e.g., 0.9 to 1.1) for the image color component ratio average may be a target range for an image to be considered to have good color balance. For example, a target range for a scene average of (R/G) and (B/G) may be within the range of 0.9 to 1.1. One or more color components (e.g., image color component ratio average) may be utilized to determine a color balance (and/or automatic white balance (AWB), etc., for example) score.

Aperture (e.g., aperture area), shutter speed (and/or time of open shutter), sensitivity (e.g., ISO), image exposure, target exposure, and/or a ratio of target exposure to image exposure may be examples of other image property measures. In some configurations, aperture, shutter speed, and/or sensitivity may be provided as image capture settings and/or may be recorded in image metadata. In some approaches, image exposure may be evaluated in accordance with the formula: log(ImageExposure)=log(ApertureArea)+log(ShutterOpenTime)+log(Sensitivity), where ImageExposure is the image exposure (e.g., exposure of the scene), ApertureArea is the aperture (e.g., lens aperture area) utilized to capture the image, ShutterOpenTime is the amount of time the shutter is open (related to shutter speed, for example), and Sensitivity is the sensor sensitivity (e.g., ISO). In some configurations, the image quality scorer 122 may also evaluate a target exposure (e.g., Exposure Target). For example, Exposure Target may be evaluated (e.g., calculated) by metering an 18% gray image. A target exposure to image exposure ratio (e.g., ExposureTarget/ImageExposure) may also be evaluated. A range (e.g., 0.8 to 1.1) for the target exposure to image exposure ratio may be target range for an image to be considered to have good exposure. For example, a target range for ExposureTarget/ImageExposure may be within the range of 0.8 to 1.1.

Some examples of image property measures (and related image quality parameters) and corresponding target ranges are given in Table (2). Additional or alternative image property measures and/or image quality parameters may be utilized.

TABLE (2)

| Image Property Measure | Target Range (min-max) | Value | Status |
|---|---|---|---|
| MTF (Sharpness) | 0.5-1.0 | 0.2 | Failed |
| White Balance (e.g., AWB) | 0.9-1.1 | 1.5 | Failed |
| Anti-banding | If a light source oscillates with 50 hertz (Hz), and the exposure needed for the image or video is not divisible by 10, then brighter bands may appear across the image. This demonstrates frequency mismatch. | | |

In the examples provided in Table (2), "Value" denotes example values of the corresponding image property measures, and "Status" denotes example statuses of corresponding image property measures in view of the target ranges. For instance, an image property measure value of 0.2 is outside of the target range for MTF, and thus may be considered a failure (e.g., may indicate a corresponding image quality parameter score of 0).

In some approaches, determining the image quality score may include calculating (e.g., computing, evaluating, etc.) one or more image quality parameter scores. An image quality parameter score may be a score for an aspect of image quality of an image. The image quality scorer 122 may calculate an image quality parameter score for each of one or more selected image quality parameters based on one or more image property measures. In some configurations, calculating the image quality parameter score may include mapping one or more image property measures to one or more image quality parameter scores. In some approaches, the mapping may be accomplished with one or more look-up tables and/or one or more mathematical functions. For example, calculating an image quality parameter score may include determining whether at least one image property measure is within a target range or one or more tolerance ranges and calculating the image quality parameter score based on whether the image property measure is within the target range or a tolerance range. For instance, if the image property measure is within the target range, the corresponding image quality parameter score may be a predetermined value (e.g., a maximum score, 100, 10, etc.). In some configurations, if the image property measure is within a tolerance range, calculating the image quality parameter score may be based on a function that decreases the image quality parameter score as the image property measure departs from (e.g., distances from, goes further away from, etc.) the target range. For example, the function may be a linear function, exponential function, logarithmic function, step function, etc. If the image property measure is outside of the target range and tolerance range(s), the corresponding image quality parameter score may be a predetermined value (e.g., a minimum score, 0, etc.).

In some configurations, the image quality scorer 122 may calculate (e.g., compute, evaluate, etc.) the image quality score (e.g., overall score, final score, etc.) based on each image quality parameter score and one or more image quality parameter weights. For example, the image quality scorer 122 may calculate the image quality score as an average (e.g., weighted) average based on the image quality parameter score(s) and/or image quality parameter weight(s). In some configurations, calculating the image quality score may be accomplished in accordance with the formula given in Equation (1).

$$x_{avg} = \frac{\sum_{i=1}^{N} w_i x_i}{\sum_{i=1}^{N} w_i} \quad (1)$$

In Equation (1), $x_{avg}$ is the image quality score (e.g., weighted average of image quality parameter score(s)), N is the number of image quality parameter scores (e.g., number of scores corresponding to selected image quality parameters), i is an index value, $x_i$ is the one or more image quality parameter scores (corresponding to one or more selected image quality parameters, for example), and $w_i$ is the one or more image quality parameter weights (corresponding to one or more selected image quality parameters, for example). In some approaches, image quality parameter selection may be performed by applying image quality parameter weight(s) with a value of zero to any unselected image quality parameters in the image quality score calculation. In other approaches, image quality parameter score(s) and/or weight(s) corresponding to any unselected image quality parameters may be excluded from the calculation. As described herein, the image quality score may be calculated in several different ways (based on mode, for example) using the formula given in Equation (1).

In some configurations, the image quality scorer 122 may determine a score level based on the image quality score. For example, the range of possible image quality scores may be partitioned (e.g., divided) into two or more score levels. For instance, the image quality score (e.g., overall score) may be categorized into five levels. A first score level (e.g., L1) may include image quality scores of 100. An image quality score in the first level may indicate very good image quality (where no retake is needed, for example). A second score level (e.g., L2) may include image quality scores from 90-99. An image quality score in the second level may indicate good image quality (where no retake is needed, for example). A third score level (e.g., L3) may include image quality scores from 50-89. An image quality score in the third level may indicate fair or average image quality (where a retake with minor changes may be beneficial and/or suggested, for example). A fourth score level (e.g., L4) may include image quality scores from 10-49. An image quality score in the fourth level may indicate poor image quality (where a retake may be beneficial with clear suggestion(s), for example). A fifth score level (e.g., L5) may include image quality scores from 0-9. An image quality score in the fifth level may indicate very poor image quality (where a retake may be beneficial, suggested, and/or mandatory, for example). In some configurations of the systems and methods disclosed herein, the electronic device 102 may automatically retake (e.g., immediately retake) one or more images in a case that the image quality score is within one or more ranges (e.g., in score levels L5, L4, and/or L3). It should be noted that the number of score levels may vary and/or the image quality scores for each score level may vary.

Feedback may be an indication of image quality (e.g., an indication of image quality that is output or provided). For example, feedback may include and/or may be based on one or more image quality parameters, one or more image quality parameter weights, one or more image property measures, one or more image quality parameter scores, one or more image quality scores, and/or one or more image quality score levels. Feedback may be provided to a user in some configurations and/or cases.

In some configurations, the feedback determiner 124 may determine and/or provide feedback based on the image quality score. For example, the feedback determiner 124 may determine one or more kinds of feedback, including one or more of visual feedback on the display 132 (e.g., text showing the image quality score, symbol(s), text, graphics, graphic effects, etc.), acoustic feedback (e.g., one or more tones, jingles, sounds, speech, etc.), tactile feedback, communication signal feedback (e.g., sending a feedback message to another device, to a smartphone, to an email address, to a control system, etc.) corresponding to the image quality score and/or score level, and/or other forms of feedback. For example, each image quality score (e.g., score level) may correspond to (e.g., map to) one or more feedbacks (from a set of feedbacks, for instance). Additionally or alternatively, each image quality parameter score (and/or image property measure) may correspond to (e.g., map to) one or more feedbacks (from a set of feedbacks, for instance). For instance, one or more image property measures and/or image quality scores indicating underexposure may map to a moon symbol or emoji.

In some configurations, the feedback determiner 124 may provide (e.g., present, display, output, etc.) one or more kinds of feedback, including one or more of visual feedback on the display 132 (e.g., text showing the image quality score, symbol(s), text, graphics, graphic effects, etc.), acoustic feedback (e.g., one or more tones, jingles, sounds, speech, etc.), tactile feedback, communication signal feedback (e.g., sending a feedback message to another device, to a smartphone, to an email address, to a control system, etc.), and/or other forms of feedback. For example, the feedback determiner 124 may present the image quality score on the display 132 (e.g., user interface 134), may present a symbol (e.g., emoticon, emoji, etc.) corresponding to the score level, may provide one or more image quality parameter scores, may present text indicating one or more suggestions for improving the image quality, may present a thumbnail of the image, may output a speech signal, etc.

Some examples of feedback (e.g., a feedback mechanism to the end user) that may be implemented in accordance with the systems and methods disclosed herein are provided herein. For example, a graphical indication using emoji and other use cases may include the following. The image quality score and/or other feedback to the end user may be in graphical form. In some cases, the feedback may include voice feedback and/or text feedback overlapped on top of a captured image (e.g., image thumbnail). For instance, one or more emojis may be shown on top of a thumbnail image, which may be shown when captured. One or more of the following emojis may be used (and/or may not be limited to the following).

A stylized image of numbers (e.g., "100" or "10") or numeric characters may be provided as feedback corresponding to the image quality score. An emoji depicting raised hands may be provided as feedback for very good image quality (e.g., maximum image quality score, 100 image quality score, L1 score level, etc.). An emoji depicting an "ok" hand gesture may be provided as feedback for good image quality (e.g., image quality score of 90-99, L2 score level, etc.). An emoji depicting a "thumbs up" hand gesture may be provided as feedback for fair or average image quality (e.g., 50-89, L3 score level, etc.). An emoji depicting a "thumbs down" hand gesture may be provided as feedback for poor image quality (e.g., 10-49, L4 score level, etc.). An emoji depicting a "no" gesture may be provided as feedback for very poor image quality (e.g., 0-9, L5 score level, etc.). An emoji depicting a discolored face may be provided as feedback for incorrect color balance (e.g., an out-of-range color balance image quality parameter score). An emoji depicting a waving hand may be provided as feedback for a blurry image (e.g., an out-of-range sharpness image quality parameter score). An emoji depicting a moon may be provided as feedback for an underexposed image (e.g., a sub-range exposure image quality parameter score). An emoji depicting a sun may be provided as feedback for an overexposed image (e.g., an above-range exposure image quality parameter score).

Based on the image quality score, score level, image quality parameter score(s), and/or image property measure(s), one or more symbols (e.g., emoji) may be displayed with or without one or more suggestions for improvement. In some configurations, speech (e.g., voice) cues may additionally or alternatively be provided (in a similar manner as the visual feedback described above, for example). For instance, a speaker on the electronic device 102 may output speech that states: "Your image quality score is 100—very good," "Your image quality score is 10—poor; underexposed." Other sounds may be utilized (e.g., a bell sound for L1 image quality scores, a buzzer sound for L5 image quality scores, etc.).

In some configurations, feedback may be provided while the electronic device 102 is enabled for image capture (e.g., via a preview mode of the viewfinder prior to and/or during capture). Additionally or alternatively, the feedback may be provided within a short period of time after capture (e.g., immediately following capture and image quality score evaluation in or near real-time). For example, providing immediate feedback may enable the user (and/or electronic device 102) to determine whether to capture another image without needing to open the image for review. This may enable feedback to be provided while avoiding delays that could result in the scene changing before another image may be captured. In some examples, the feedback(s) may be presented as overlaying all or a portion of a camera stream (e.g., image frames that show the current camera view for capture), viewfinder, and/or of an image capture interface. For instance, the feedback(s) may be presented as a thumbnail image overlaying a corner of a camera stream with one or more symbols (e.g., emoji) and/or characters (e.g., the image quality score). Additionally or alternatively, an acoustic feedback may be provided to enable the user to avoid averting his or her gaze from the camera stream (e.g., center of the camera stream). In some approaches, providing the feedback may include presenting an animation where the captured image frame appears to be scaled down to thumbnail size and where one or more other feedbacks (e.g., symbols, emoji, number(s), character(s), etc.) are provided before, by, and/or at the time the image is scaled to thumbnail size. The feedback may remain statically provided indefinitely (for the most recent capture, for example) or may be removed after a period of time (e.g., 2 seconds, 4 seconds, 5 seconds, 10 seconds, 1 minute, 2 minutes, etc.).

In some configurations, one or more of the image obtainer 114, the capture mode obtainer 116, the image quality parameter adapter 118, the image quality scorer 122, and/or the feedback determiner 124 may be implemented in one or more blocks. For example, the image quality parameter adapter 118 and/or the image quality scorer 122 may be implemented in one or more blocks (e.g., circuitries) included in and/or separate from the processor 112. For instance, the image quality parameter adapter 118 and/or the image quality scorer 122 may be implemented in hardware separate from the processor 112. For example, the processor 112 may not include the image quality parameter adapter 118 and the image quality scorer 122, and the image quality parameter adapter 118 and the image quality scorer 122 may be implemented in a different block (e.g., dedicated hardware, GPU, etc.) in the electronic device 102. Alternatively, the image quality parameter adapter 118 and the image quality scorer 122 may be implemented in the processor 112. In other configurations, the image quality parameter adapter 118 and/or the image quality scorer 122 may be implemented partially in the processor 112 and partially in another hardware block.

It should be noted that one or more of the elements or components of the electronic device 102 may be combined and/or divided. For example, one or more of the image obtainer 114, the capture mode obtainer 116, the image quality parameter adapter 118, the image quality scorer 122, and/or the feedback determiner 124 may be combined. Additionally or alternatively, one or more of the image obtainer 114, the capture mode obtainer 116, the image quality parameter adapter 118, the image quality scorer 122, and/or the feedback determiner 124 may be divided into elements or components that perform a subset of the operations thereof.

Figure 2:
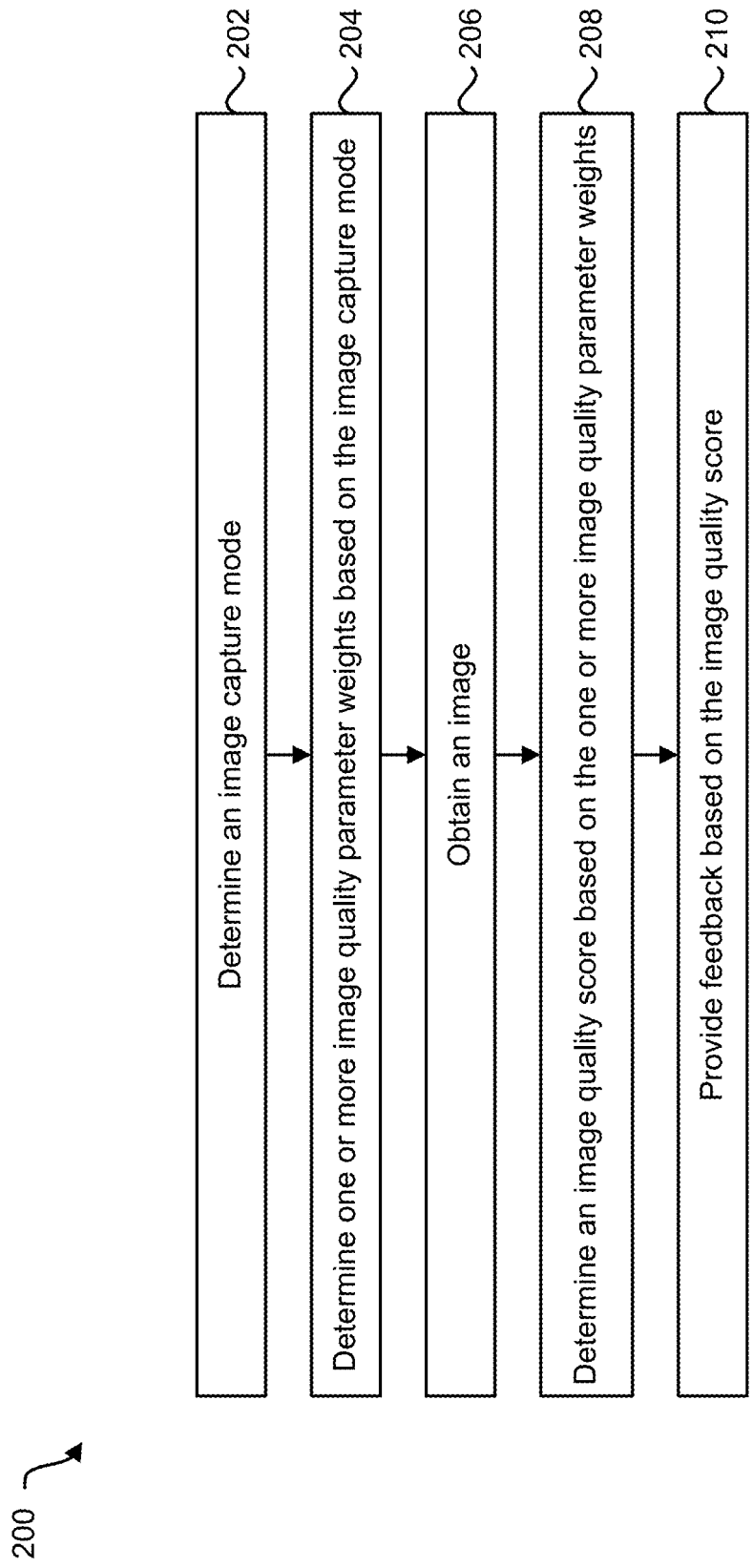
FIG. 2 is a flow diagram illustrating one configuration of a method for producing image feedback.

FIG. 2 is a flow diagram illustrating one configuration of a method 200 for producing image feedback. The method 200 may be performed by the electronic device 102 described in connection with FIG. 1, for example. The electronic device 102 may determine 202 an image capture mode. This may be accomplished as described in connection with FIG. 1. For example, the electronic device 102 may receive an input and/or obtain an input device state that indicates the capture mode.

The electronic device 102 may determine 204 one or more image quality parameter weights based on the image capture mode. This may be accomplished as described in connection with FIG. 1. For example, the electronic device 102 may select a set of equal image quality parameter weights in a case that an auto mode is selected, may select a predetermined set of one or more image quality parameter weights in a case that a semi-automatic mode is selected, or may select one or more image quality parameter weights based on the selected manual mode and/or one or more settings in a case that a manual mode is selected.

The electronic device 102 may obtain 206 an image (e.g., one or more images). This may be accomplished as described in connection with FIG. 1. For example, the electronic device 102 may capture an image or may receive an image from another device.

The electronic device 102 may determine 208 an image quality score based on the one or more image quality parameter weights. This may be accomplished as described in connection with FIG. 1. For example, the electronic device 102 may evaluate one or more image property measures. The electronic device 102 may calculate an image quality parameter score for each of the one or more selected image quality parameters. The electronic device 102 may calculate the image quality score based on each image quality parameter score and/or the image quality parameter weight(s). In some configurations, the electronic device 102 may determine a score level based on the image quality score.

The electronic device 102 may provide 210 feedback based on the image quality score. This may be accomplished as described in connection with FIG. 1. For example, the electronic device 102 may determine feedback corresponding to the image quality score, score level, image quality parameter score, and/or image property measure(s). The feedback may be presented/provided (e.g., shown on a display, output with a speaker, etc.).

FIG. 3 illustrates an example of an image with unfocused details 340 and an example of an image with focused details 342. Image A 336 is an image of a duck, where unfocused details 340 reduce image quality. In particular, it can be observed that some of the fine detail of the feathers is diminished. The reduced quality of image A 336 may be indicated in accordance with some configurations of the systems and methods disclosed herein. For example, image A 336 may have a low sharpness score and/or a low blur score. The low sharpness score and/or low blur score may contribute to an overall lower image quality score and/or score level. Feedback may be provided in order to indicate the lower image quality.

Image B 338 is an image of a duck, where focused details 342 illustrate high image quality. In particular, it can be observed that fine detail, such as the feather edges and feather highlights in image B 338 are sharper in comparison with those of image A 336. It may be challenging to provide accurate feedback for image quality in a case like image B 338, where the subject (e.g., the duck) is sharp, but the background is unfocused and/or blurry due to capture mode (e.g., aperture, depth of field, etc.).

Figure 4:
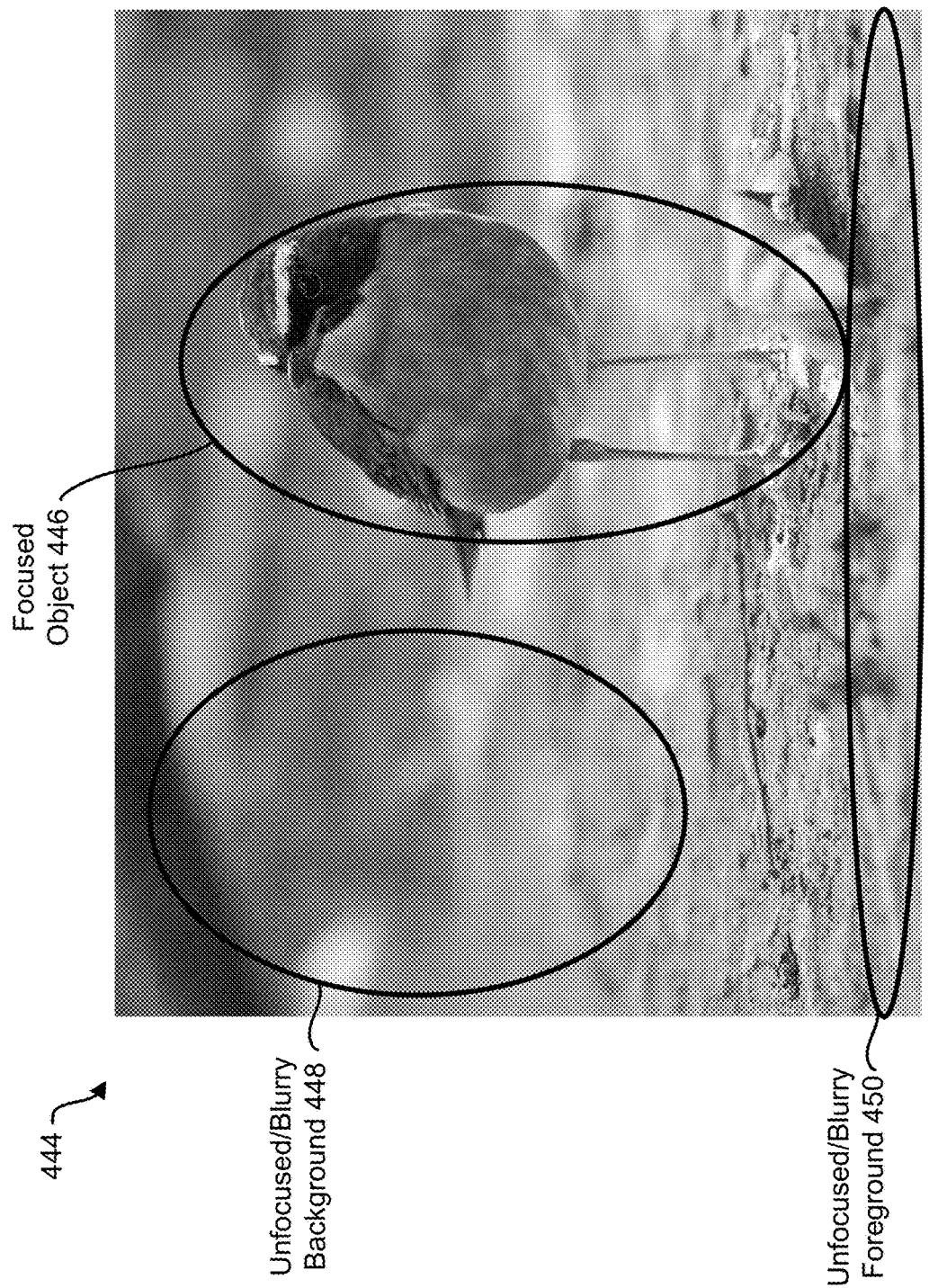
FIG. 4 illustrates another example of an image.

FIG. 4 illustrates another example of an image 444. In particular, the image 444 illustrated in FIG. 4 may be captured with an aperture capture mode. For example, an aperture capture mode may be selected in order to introduce blur in the background and/or foreground. As illustrated in FIG. 4, the image 444 includes a focused object 446 (i.e., a bird) with an unfocused/blurry background 448 and an unfocused/blurry foreground 450. Some configurations of the systems and methods disclosed herein may be intelligent enough to ignore one or more image quality parameters such as sharpness and/or exposure when determining image quality (e.g., an image quality score), because the captured image 444 (e.g., photo) will likely have a sharpness issue and/or an exposure issue. For instance, calculating an image score based on a sharpness parameter and an exposure parameter for the image 444 may result in a low image quality score, even though image quality is actually high.

Selecting a semi-automatic mode or a manual mode may affect one or more characteristics (e.g., image property measure(s), image parameter score(s), etc.). In accordance with some configurations of the systems and methods disclosed herein, whenever a semi-automatic or manual capture mode is selected, where one or more image quality parameters may be affected, those image quality parameters may be ignored and/or weighted lower for processing and scoring. This may enable more accurate scoring and/or feedback for images (e.g., photos).

Figure 5:
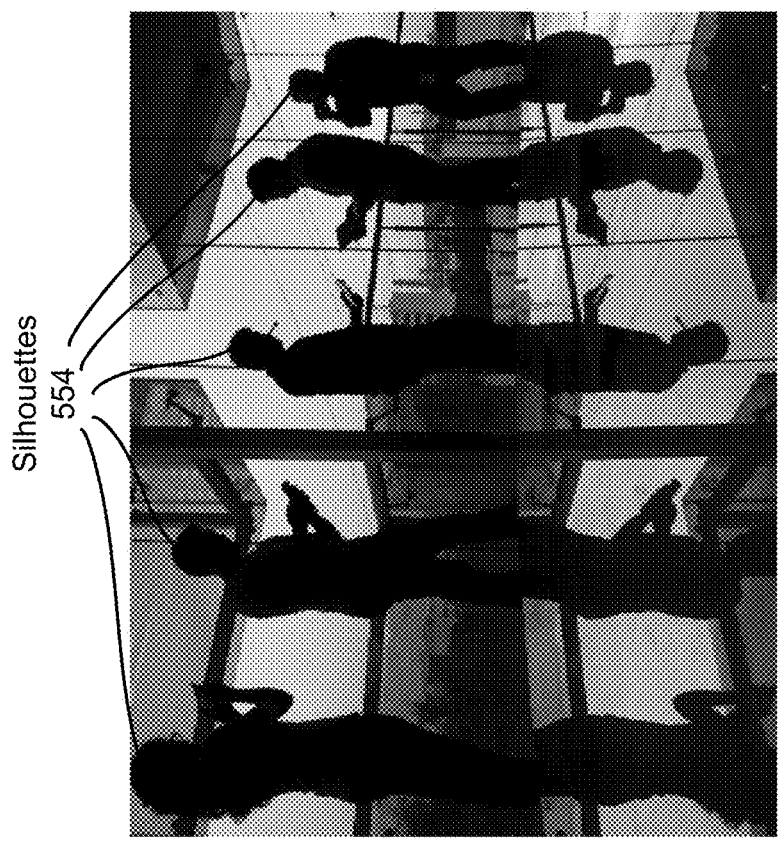
FIG. 5 illustrates another example of an image.

FIG. 5 illustrates another example of an image 552. As illustrated in FIG. 5, the image 552 includes several silhouettes 554. In some cases (e.g., based on an auto capture mode and/or some semi-automatic capture modes), the image 552 may be categorized as a poor image. For example, the image 552 may receive a poor image quality score due to a low exposure score. Some configurations of the systems and methods disclosed herein may enable ignoring the exposure image quality parameter when determining image quality (e.g., an image quality score). For example, the electronic device 102 may detect selection of manual settings and may automatically ignore the exposure image quality parameter. Additionally or alternatively, the electronic device 102 may receive an input (e.g., a user input) that lowers a weight on the exposure image quality parameter score and/or ignores the exposure image quality parameter. The same image may receive a high score when the exposure parameter is ignored (e.g., when the user sets image quality parameters that ignore exposure).

Figure 6:
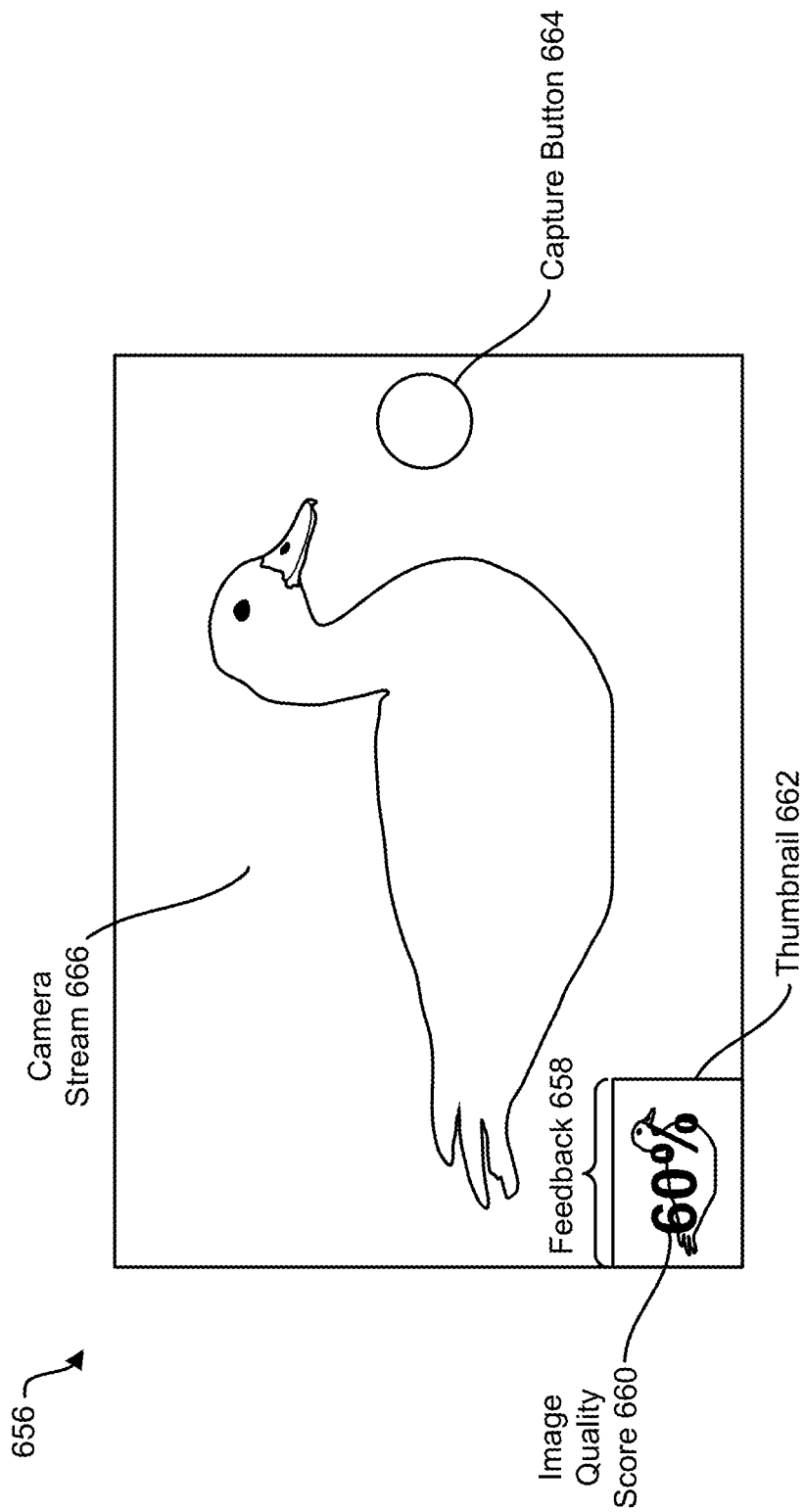
FIG. 6 illustrates an example of a camera application user interface in accordance with some configurations of the systems and methods disclosed herein.

FIG. 6 illustrates an example of a camera application user interface 656 in accordance with some configurations of the systems and methods disclosed herein. The camera application user interface 656 may be one example of the user interface 134 described in connection with FIG. 1. In this example, the camera application user interface 656 may provide a camera stream 666 (e.g., image data from the camera viewpoint) and a capture button 664. When a touch input corresponding to the capture button 664 is detected, the electronic device 102 may capture the image and produce feedback 658 corresponding to the captured image.

In the example of FIG. 6, the feedback may include an image quality score 660 displayed on a thumbnail 662 of the captured image. For instance, the electronic device 102 may determine the image quality score 660 based on one or more image quality parameter scores as described herein. The feedback 658 may be provided without opening the captured image (e.g., opening the captured image in an image viewer). Additionally or alternatively, the feedback 658 may be provided prior to opening the image for viewing. For example, the feedback 658 may be provided while the electronic device is enabled to capture another image. This may allow for quick capture of another image in case that the previously captured image has less than a desired image quality. As described herein, the feedback 658 may be determined based on the image capture mode. Other examples of feedback may include one or more symbols, emojis, suggestion(s), etc., which may or may not be overlaid on a thumbnail. For example, one or more emojis may be displayed in the upper right hand corner. In addition to or alternatively from the example of feedback 658 illustrated. It should be noted that the systems and methods disclosed herein may be implemented in a variety of configurations (with or without physical buttons, with or without touchscreens, etc.).

After an image is captured with an electronic device (e.g., user equipment (UE)) camera, the image may be processed by set algorithms to determine one or more image quality parameter scores and determine an overall image quality score (e.g., a rating from 0 to 100%) based on one or more parameters like sharpness, white balance, color balance, blur, exposure, and/or brightness.

For example, if captured photo quality is excellent based on one or more of the image quality parameters, an image quality score (e.g., 91 to 100%) may be shown on top of a thumbnail image. As illustrated in FIG. 6, a thumbnail image may be presented in a corner of a photo application. After capturing an image, if the image quality score is good, then the feedback may show 81 to 90%. If the image quality score is fair, then the feedback may show 61 to 70%. If the image quality score is bad, then the feedback may show less than or equal to 60%, etc. Other scales and/or ratings may be given as feedback. The image quality score (e.g., percentage score, %, etc.) may help a user to decide whether to take one or more images (e.g., retake pictures) immediately or not. This may help the user avoid opening and checking the captured photo for quality on each attempt.

Figure 7:
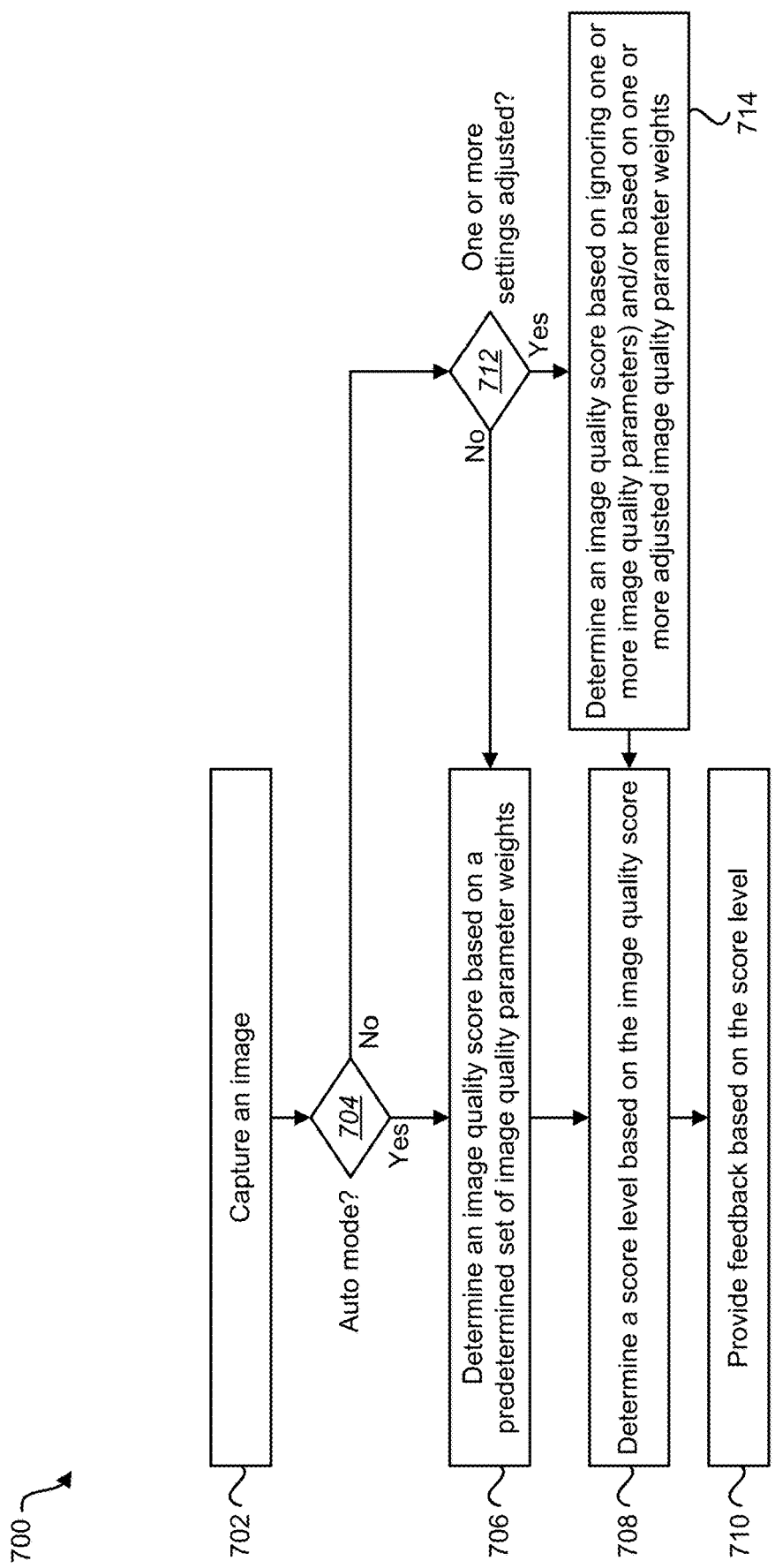
FIG. 7 is a flow diagram illustrating another configuration of a method for producing image feedback.

FIG. 7 is a flow diagram illustrating another configuration of a method 700 for producing image feedback. The method 700 may be performed by the electronic device 102 described in connection with FIG. 1, for example. In particular, FIG. 7 illustrates a method 700 for processing the image based on one or more camera settings (e.g., feature options) selected by a user and for indicating feedback (e.g., a quality measure, rating, etc.).

The electronic device 102 may capture 702 an image (e.g., one or more images). This may be accomplished as described in connection with FIG. 1.

The electronic device 102 may determine 704 whether the image capture mode (for capturing 702 the image) is an auto mode. This may be accomplished as described in connection with FIG. 1. For example, the electronic device 102 may determine whether an auto mode, semi-automatic mode, or manual mode is used to capture 702 the image. In some configurations, the determination 704 may be based on input (e.g., user input indicating a capture mode). Additionally or alternatively, the electronic device 102 may determine 704 whether the capture mode was auto mode based on image metadata, an input device (e.g., dial, switch, etc.) state, and/or a signal received from a remote device (e.g., a remote camera).

In a case that the image capture mode is auto mode, the electronic device 102 may determine 706 an image quality score based on a predetermined set of image quality parameter weights. This may be accomplished as described in connection with FIG. 1. For example, the electronic device 102 may select a set of equal image quality parameter weights in a case that an auto mode is selected.

In some configurations, determining 706 the image quality score may include evaluating one or more image property measures. Determining 706 the image quality score may also include calculating one or more image quality parameter scores based on the image property measures and one or more threshold values (e.g., a target range and/or tolerance range(s)). For example, an image quality parameter score may vary based on whether the image property measure is lower than a lowest threshold (e.g., out of the target range and/or tolerance range(s)), between thresholds (e.g., in a tolerance range or in a target range), or greater than a highest threshold (e.g., out of the target range and/or tolerance range(s)). Determining 706 the image quality score may include determining a combination (e.g., an average, weighted average, etc.) of image quality parameter scores (based on the predetermined set of image parameter weights, for example).

In a case that the image capture mode is not auto mode (e.g., the image capture mode is manual mode or semi-automatic mode), the electronic device 102 may determine 712 whether one or more settings are adjusted. The one or more settings may be adjusted from default settings corresponding to auto mode or a semi-automatic mode. For example, the electronic device 102 may determine whether an input is received to adjust one or more settings (e.g., aperture setting, exposure setting, white balance setting, color balance setting, shutter speed setting, etc.). If no setting is adjusted, the electronic device 102 may determine 706 an image quality score based on a predetermined set of image quality parameter weights. In a case of a semi-automatic mode, for example, the electronic device 102 may utilize a predetermined set of weights corresponding to the semi-automatic mode.

In a case that one or more settings are adjusted, the electronic device 102 may determine 714 an image quality score based on ignoring one or more image quality parameters and/or based on one or more adjusted image quality parameter weights. This may be accomplished as described in connection with FIG. 1. For example, the electronic device 102 may ignore (e.g., exclude, de-select, etc.) one or more image quality parameters that are impacted by the adjusted setting(s) in determining 714 the image quality score. Additionally or alternatively, the electronic device may determine the image quality score based on adjusted image quality parameter weight(s). For example, the electronic device 102 may adjust (e.g., reduce or increase) one or more image quality parameter weights corresponding to one or more image quality parameters that may be affected by the adjusted setting(s). The image quality score may be determined 714 based on the ignored and/or adjusted image quality parameter weight(s).

In some configurations, determining 714 the image quality score may include evaluating one or more image property measures. Determining 714 the image quality score may also include calculating one or more image quality parameter scores based on the image property measures and one or more threshold values (e.g., a target range and/or tolerance range(s)). For example, an image quality parameter score may vary based on whether the image property measure is lower than a lowest threshold (e.g., out of the target range and/or tolerance range(s)), between thresholds (e.g., in a tolerance range or in a target range), or greater than a highest threshold (e.g., out of the target range and/or tolerance range(s)). Determining 714 the image quality score may include determining a combination (e.g., an average, weighted average, etc.) of image quality parameter scores based on the ignored image quality parameter(s) (e.g., based on a subset of image quality parameters) and/or the adjusted image quality parameter weight(s).

The electronic device 102 may determine 708 a score level based on the image quality score. This may be accomplished as described in connection with FIG. 1. For example, the electronic device 102 may determine 708 whether the image quality score corresponds to one or more ranges based on one or more threshold values. For instance, if the image quality score is 93, the electronic device 102 may determine that the image quality score is lower than a threshold value (e.g., 100) for a first score level, but is higher than a threshold value (e.g., 89) for a third score level, thereby resulting in a second score level.

The electronic device 102 may provide 710 feedback based on the score level. This may be accomplished as described in connection with FIG. 1. For example, the electronic device 102 may determine feedback corresponding to the score level. The feedback may be provided (e.g., presented on a display, output with a speaker, etc.).

Figure 8:
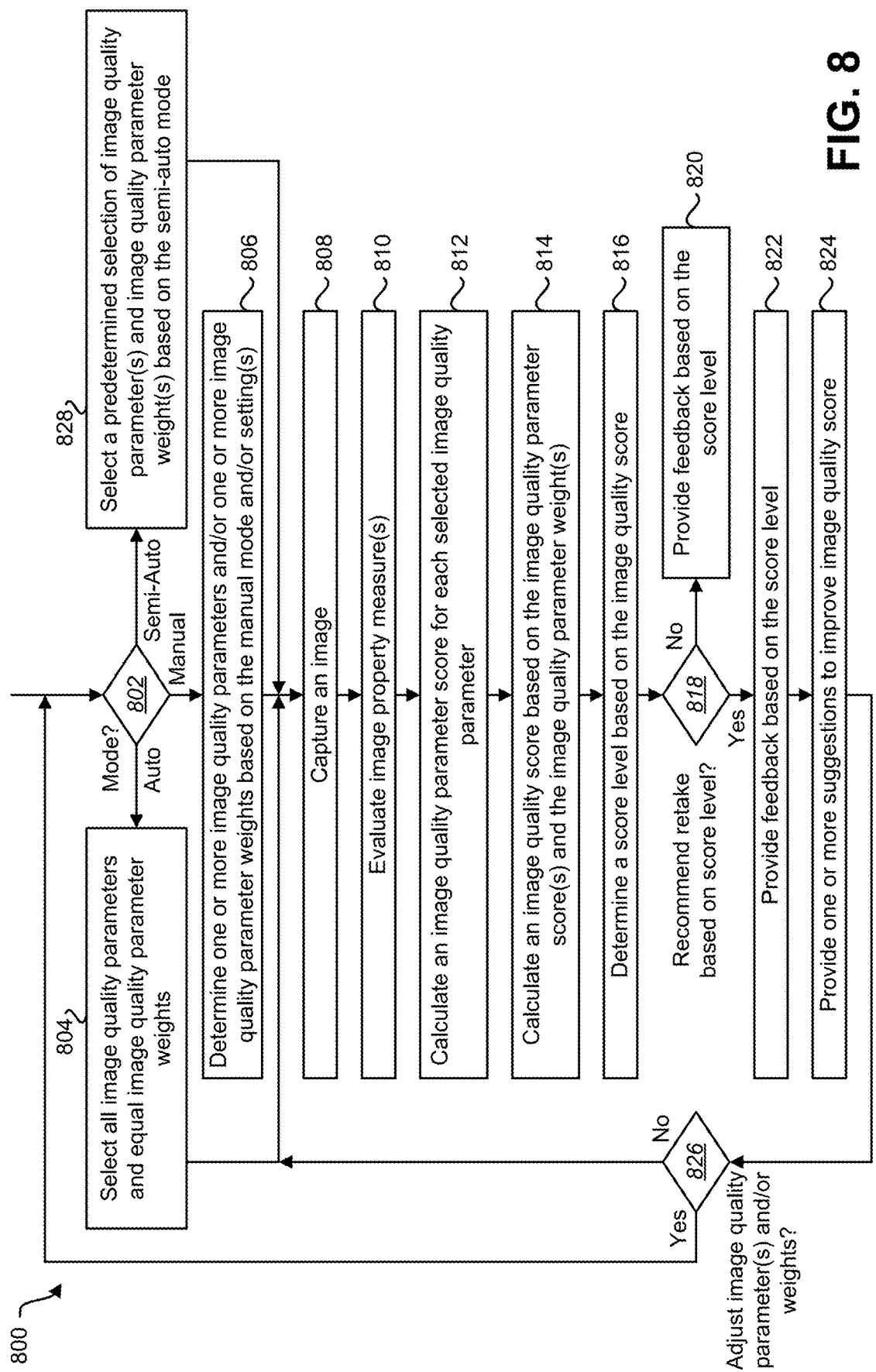
FIG. 8 is a flow diagram illustrating a more specific configuration of a method for producing image feedback.

FIG. 8 is a flow diagram illustrating a more specific configuration of a method 800 for producing image feedback. The method 800 may be performed by the electronic device 102 described in connection with FIG. 1, for example. The electronic device 102 may determine 802 an image capture mode. This may be accomplished as described in connection with FIG. 1. For example, the electronic device 102 may receive an input and/or obtain an input device state that indicates the capture mode. The capture mode may be an auto mode, a semi-automatic mode (e.g., one of a set of semi-automatic modes), or a manual mode (e.g., one of a set of manual modes). Accordingly, the electronic device 102 may provide one or more options (e.g., capture mode and/or one or more settings).

In a case that the capture mode is manual, the electronic device 102 may determine 806 one or more (e.g., all or a subset of) image quality parameters and/or may determine a one or more image quality parameter weights based on the manual mode and/or one or more settings. This may be accomplished as described above in connection with FIG. 1. For example, the electronic device 102 may determine one or more image quality parameters corresponding to the manual mode and/or settings. For example, the electronic device 102 may automatically determine one or more image quality parameters and/or one or more image quality parameter weights based on the manual mode and/or one or more settings. For instance, one or more default image quality parameters and/or one or more default image quality weights may be initially determined and/or selected (corresponding to the manual mode, for example). If an input is received to adjust one or more settings (e.g., aperture, shutter speed, white balance, color balance, exposure, sensitivity, etc.), the electronic device 102 may automatically determine one or more corresponding image quality parameters and/or one or more corresponding image quality parameter weights. For instance, if a user adjusts an aperture setting to a setting that will likely result in a blurry background, the electronic device 102 may exclude a sharpness image quality parameter and/or set the sharpness image quality parameter weight to 0. Additionally or alternatively, the electronic device 102 may obtain (e.g., receive) an input and may determine the one or more image quality parameters and/or the one or more image quality parameter weights based on the input. For instance, an input may indicate whether to include and/or exclude one or more image quality parameters and/or may indicate one or more values for one or more image quality parameter weights.

It should be noted that one of a set of manual modes may be selected and/or utilized in some configurations. Examples of manual modes may include aperture priority mode, shutter priority mode, program mode, full manual mode, etc., in some configurations. Accordingly, the electronic device 102 may initially determine one or more image quality parameters and/or one or more image quality parameter weights for a first manual mode, one or more image quality parameters and/or one or more image quality parameter weights for a second manual mode, and so on. The selection of image quality parameter(s) and/or the selection of image quality parameter weight(s) may be adjusted or changed based on one or more manual setting inputs.

If the capture mode is semi-automatic, the electronic device 102 may select 828 a predetermined set (e.g., all or a subset) of image quality parameters and may select one or more image quality parameter weights based on the semi-automatic mode. This may be accomplished as described above in connection with FIG. 1. For example, the electronic device 102 may select (e.g., include) a predetermined set of image quality parameters corresponding to the semi-automatic mode. It should be noted that one of a set of semi-automatic modes may be selected and/or utilized in some configurations. Examples of semi-automatic modes may include low light (e.g., night) mode, action mode, landscape mode, etc. Accordingly, the electronic device 102 may select a first predetermined set of image quality parameters and/or a first predetermined set of image quality parameter weights for a first semi-automatic mode, a second predetermined set of image quality parameters and/or a second predetermined set of image quality parameter weights for a second semi-automatic mode, and so on. For instance, a predetermined set of image quality parameters and/or a predetermined set of image quality parameter weights may be selected for low-light mode. Another predetermined set of image quality parameters and/or another predetermined set of image quality parameter weights may be selected for action mode, etc.

In a case that the capture mode is auto, the electronic device 102 may select 804 all image quality parameters and may select equal image quality parameter weights. This may be accomplished as described above in connection with FIG. 1. For example, the electronic device 102 may select (e.g., include) all image quality parameters of a set of image quality parameters. Additionally or alternatively, the electronic device 102 may select all equal image quality parameter weights. For example, each image quality parameter weight may have the same value.

The electronic device 102 may capture 808 an image (e.g., one or more images). This may be accomplished as described in connection with FIG. 1. For example, the electronic device 102 may capture an image with an image sensor.

The electronic device 102 may evaluate 810 one or more image property measures. This may be accomplished as described in connection with FIG. 1. For example, the electronic device 102 may evaluate 810 SFR, an average of image color component ratios, image exposure, and/or target exposure, etc. In some configurations, the electronic device 102 may evaluate 810 only the image property measure(s) needed to calculate image quality parameter score(s) for only the selected image quality parameter(s).

The electronic device 102 may calculate 812 an image quality parameter score for each selected image quality parameter. This may be accomplished as described in connection with FIG. 1. For example, the electronic device 102 may calculate 812 an image quality parameter score for each corresponding selected image quality parameter. The calculation 812 may be based on one or more image property measures. For example, the electronic device 102 may calculate 812 an image quality parameter score based on a function of one or more image property measures. In some configurations, the calculation 812 may be based on one or more ranges (e.g., a target range and/or one or more tolerance ranges). For example, if an image property measure is within a target range, the image quality parameter score may be based on a function (e.g., a mapping to a maximum image quality parameter score). If the image property measure is within a tolerance range, the image quality parameter score may be based on another function (e.g., a function that decreases the image quality parameter score as the image property measure departs from the target range. Examples are provided in connection with FIGS. 10-11. In some configurations, each image quality parameter score (for each selected image quality parameter, for example) may be calculated individually and/or separately.

The electronic device 102 may calculate 814 an image quality score based on one or more image quality parameter scores and/or the one or more image quality parameter weights. This may be accomplished as described in connection with FIG. 1. For example, the electronic device 102 may calculate 814 the image quality score based on one or more image quality parameter scores and/or one or more image quality parameter weights corresponding to one or more selected image quality parameters. For instance, the electronic device 102 may calculate a weighted average based on the image parameter score(s) and the image quality parameter weight(s).

The electronic device 102 may determine 816 a score level based on the image quality score. This may be accomplished as described in connection with FIG. 1. For example, the electronic device 102 may determine one of a set of score levels corresponding to the image quality score. In some configurations, the electronic device 102 may determine whether the image quality score is in a range (e.g., greater than a threshold, between two thresholds, less than a threshold, etc.) corresponding to a score level. For example, the electronic device 102 may compare the (overall or final) image quality score with a set of thresholds. Two or more score levels (e.g., five levels of image quality score categories) may be utilized.

The electronic device 102 may determine 818 whether to recommend a retake based on the score level. For example, each score level may indicate whether a retake should be recommended or not. For instance, a first score level (e.g., L1, image quality score of 100) may not recommend a retake. A second score level (e.g., L2 image quality score from 90-99) may not recommend a retake. A third score level (e.g., L3, image quality score from 50-89) may recommend a retake. A fourth score level (e.g., L4, image quality score from 10-49) may recommend a retake. A fifth score level (e.g., L5, image quality score from 0-9) may recommend a retake. For example, if the image quality score is greater than 89, no retake may be recommended and feedback may be provided. If the image quality score is less than or equal to 89, a retake may be recommended and feedback (e.g., image quality score and/or one or more suggestions form improvement) may be provided.

In some configurations, one or more additional actions may be taken based on the score level. For example, the electronic device 102 may automatically retake one or more images for the lowest score level. Additionally or alternatively, a retake may be mandatory for the lowest score level. Additionally or alternatively, the electronic device 102 may automatically discard an image at the lowest score level in some approaches. In other approaches, the electronic device 102 may not automatically retake an image and/or may not automatically discard the image for the lowest score level. One or more of these actions may be utilized at one or more other score levels (e.g., L4).

In a case that a retake is not recommended, the electronic device 102 may provide 820 feedback based on the score level. For example, if the score level is L1, the electronic device 102 may present a raised hands emoji and/or the image quality score. If the score level is L2, the electronic device 102 may present an "okay" hand gesture emoji and/or the image quality score.

In a case that a retake is recommended, the electronic device 102 may provide 822 feedback based on the score level. This may be accomplished as described in connection with FIG. 1. For example, if the score level is L3, the electronic device 102 may present a thumbs up emoji and/or the image quality score. If the score level is L4, the electronic device 102 may present a thumbs down emoji and/or the image quality score. If the score level is L5, the electronic device 102 may present a "no" emoji and/or the image quality score.

The electronic device 102 may provide 824 one or more suggestions to improve the image quality score. This may be accomplished as described in connection with FIG. 1. For example, the electronic device 102 may provide one or more minor suggestions for the L3 score level, one or more significant suggestions for the L4 score level, and/or one or more major suggestions for the L5 score level. In some configurations, the electronic device 102 may suggest one or more changes in capture mode (e.g., "Image blur is high; switch to action mode?"), image quality parameter(s) (e.g., "Image is underexposed; ignore exposure score?"), and/or image quality parameter weight(s) (e.g., "Background isn't sharp; lower sharpness weight?"). It should be noted that providing 822 feedback and providing 824 one or more suggestions may be combined and/or may be parts of providing feedback in some configurations.

The electronic device 102 may determine 826 whether to adjust one or more image quality parameters and/or one or image quality parameter weights. For instance, the electronic device 102 may determine whether an input is received that impacts the image quality parameter(s) and/or image quality parameter weight(s) (e.g., capture mode change, setting change, image quality parameter selection, image quality parameter weight selection, etc.). In some configurations, the electronic device 102 may prompt the user regarding whether to adjust the image quality parameter(s) and/or image quality parameter weight(s) (e.g., "Change mode?" "Change scoring?" "Change weighting?"). This prompt may be included in or separate from the feedback. If it is determined 826 not to adjust the image quality parameter(s) and/or image quality parameter weight(s), the electronic device 102 may return to capture 808 an image (e.g., retake an image). If it is determined 826 to adjust the image quality parameter(s) and/or image quality parameter weight(s), the electronic device 102 may return to determine 802 the image capture mode.

Figure 9:
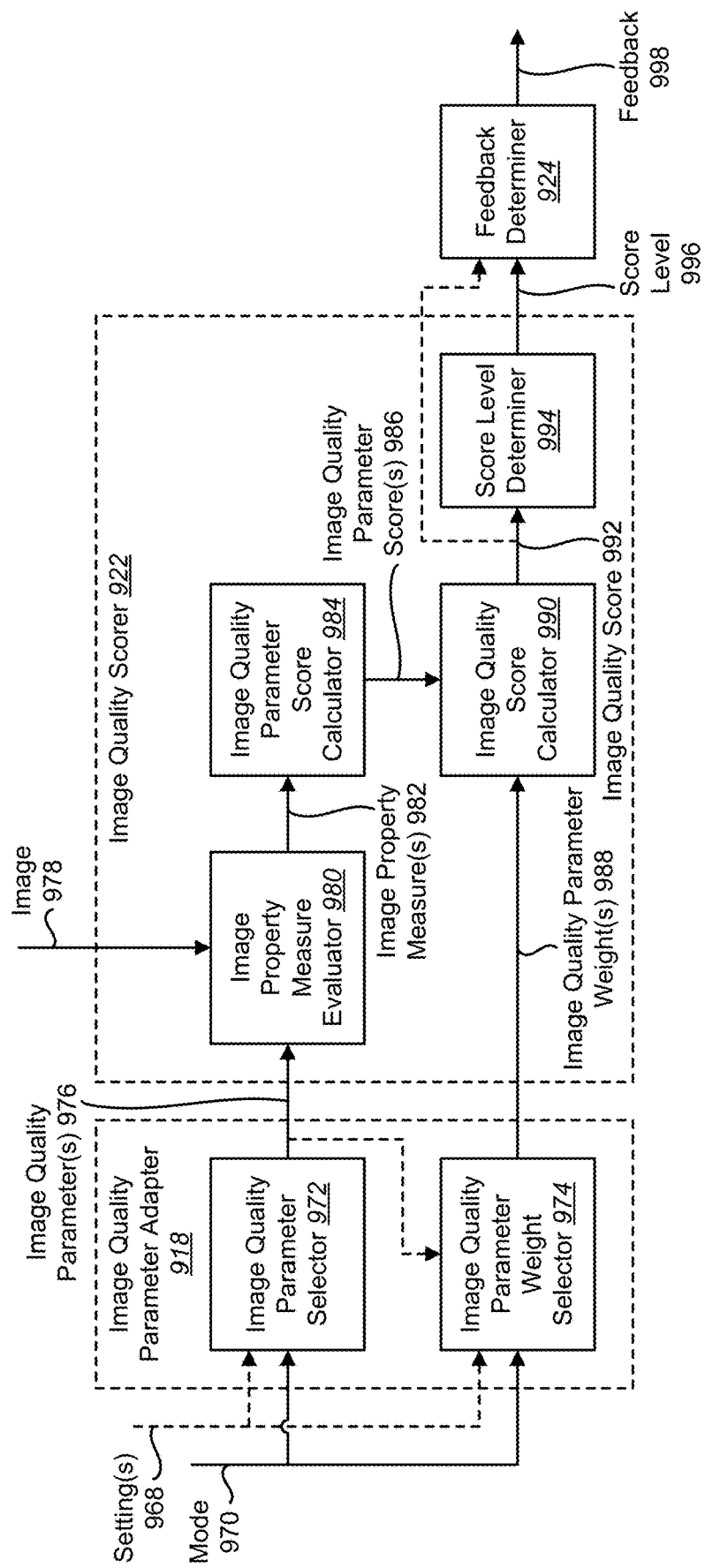
FIG. 9 is a block diagram illustrating examples of an image quality parameter adapter, an image quality scorer, and a feedback determiner that may be implemented in some configurations of the systems and methods disclosed herein.

FIG. 9 is a block diagram illustrating examples of an image quality parameter adapter 918, an image quality scorer 922, and a feedback determiner 924 that may be implemented in some configurations of the systems and methods disclosed herein. In some configurations, one or more of the elements or components described in connection with FIG. 9 may be implemented in the electronic device 102 described in connection with FIG. 1. For instance, the image quality parameter adapter 918 described in connection with FIG. 9 may be an example of the image quality parameter adapter 118 described in connection with FIG. 1. Additionally or alternatively, the image quality scorer 922 described in connection with FIG. 9 may be an example of the image quality scorer 122 described in connection with FIG. 1. Additionally or alternatively, the feedback determiner 924 described in connection with FIG. 9 may be an example of the feedback determiner 124 described in connection with FIG. 1.

The image quality parameter adapter 918 may include an image quality parameter selector 972 and/or an image quality parameter weight selector 974. The image quality parameter selector 972 may select one or more image quality parameters 976 based on the capture mode 970 (and/or optionally based on setting(s) 968). This may be accomplished as described in connection with one or more of FIGS. 1-2 and 8, for example.

The image quality parameter weight selector 974 may select one or more image quality parameter weights 988 based on capture mode 970 (and/or optionally based on setting(s) 968 and/or selected image quality parameter(s)). This may be accomplished as described in connection with one or more of FIGS. 1-2 and 8, for example.

The image quality scorer 922 may include an image property measure evaluator 980, an image quality parameter score calculator 984, an image quality score calculator 990, and/or a score level determiner 994. The image property measure evaluator 980 may evaluate one or more image property measures 982 based on the image quality parameter(s) 976 (e.g., the selected image quality parameter(s)) and the image 978. This may be accomplished as described in connection with one or more of FIGS. 1-2 and 8, for example.

The image parameter score calculator 984 may calculate one or more image quality parameter scores 986 based on the one or more image property measures 982. This may be accomplished as described in connection with one or more of FIGS. 1-2 and 8, for example. For instance, the image quality parameter score calculator 984 may calculate a sharpness score based on SFR or MTF, may calculate a color balance score (and/or white balance score) based on image color component(s), and/or may calculate an exposure score based on an exposure target to exposure scene ratio, etc. Calculating the image quality parameter score(s) may be based on one or more functions, ranges, and/or thresholds. Examples are provided in connection with FIGS. 10-11.

The image quality score calculator 990 may calculate an image quality score 992 (e.g., an overall score) based on the image quality parameter score(s) 986 and the image quality parameter weight(s) 988. This may be accomplished as described in connection with one or more of FIGS. 1-2 and 8, for example. For instance, the image quality score calculator 990 may calculate a weighted average of the image quality parameter scores 986.

The score level determiner 994 may determine a score level based on the image quality score 992. This may be accomplished as described in connection with one or more of FIGS. 1-2 and 8, for example. Another example is provided in connection with FIG. 12.

The feedback determiner 924 may determine feedback 998 (e.g., one or more feedbacks) based on the score level and/or the image quality score 992. This may be accomplished as described in connection with one or more of FIGS. 1-2 and 8, for example.

It should be noted that one or more of the elements and/or components described in connection with FIG. 9 may be optional. For example, the score level determiner 994 may be optional and/or may not be implemented in some configurations (e.g., the feedback 998 may be determined based only on the image quality score 992 and not the score level 996 in some approaches).

Figure 10:
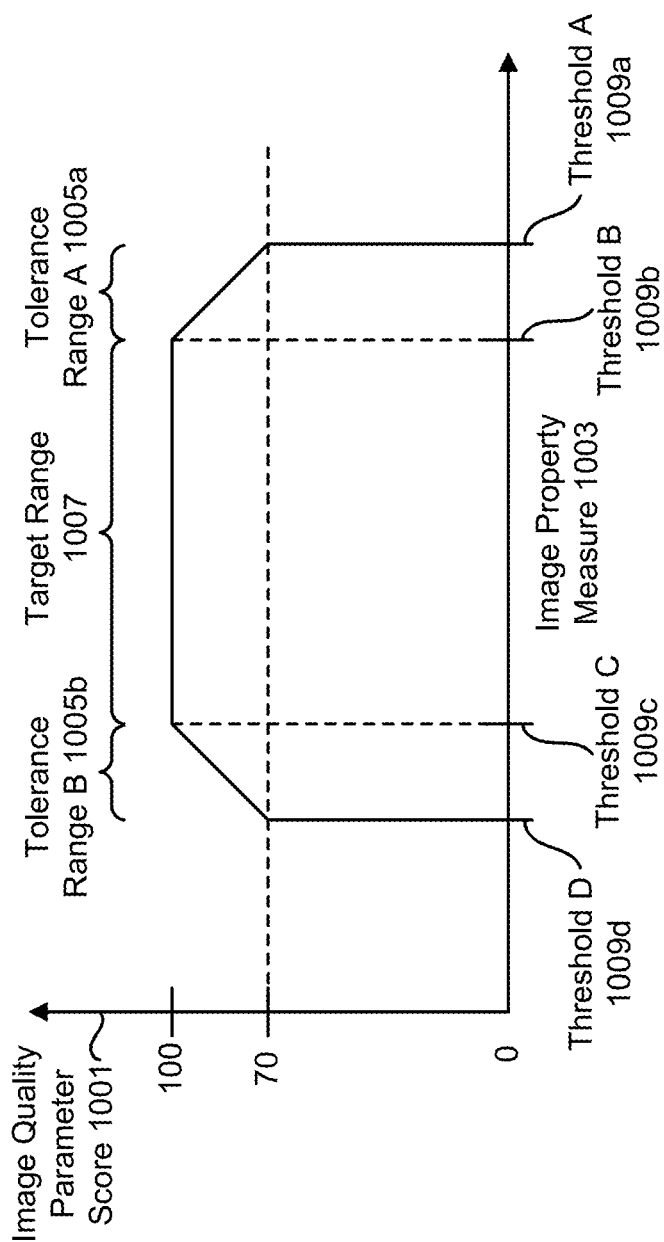
FIG. 10 is a graph illustrating an example of an approach for calculating an image quality parameter score based on an image property measure.

FIG. 10 is a graph illustrating an example of an approach for calculating an image quality parameter score 1001 based on an image property measure 1003. In this example, the image quality parameter score 1001 is illustrated on the vertical axis and the image property measure 1003 is illustrated on the horizontal axis.

In some configurations of the systems and methods disclosed herein, the scoring mechanism may utilize one or more individual scores of the parameters (e.g., image quality parameter score(s)). One or more individual image quality parameter scores for the image quality parameter(s) (e.g., selected image quality parameter(s), defined parameter(s), etc.) may be computed for the image (before computing the overall image quality score, for example). FIG. 10 illustrates an example of one of a variety of different ways to calculate an image quality parameter score. It should be noted that scores for different image quality parameters may be calculated differently (e.g., with different function(s), threshold(s), range(s), etc.). For example, the test criteria for sharpness, exposure, and/or color balance may be defined as a target range 1007 (between threshold C 1009c and threshold B 1009b, for example). For high scores (e.g., a maximum score), the image property measure 1003 (e.g., value) may fall in the target range 1007.

The graph in FIG. 10 shows a scoring mechanism (e.g., one or more functions), where the test results in a lower image quality parameter score 1001 within tolerance range A 1005a or tolerance range B 1005b, a high score (e.g., maximum score) if the image property measure 1003 is within the target range 1007, and zero if the image property measure 1003 is outside of the target range 1007 and the tolerance ranges 1005a-b. For example, if the image property measure 1003 is within tolerance range A 1005a or tolerance range B 1005b, the image quality parameter score 1001 may be based on a function that decreases the image quality parameter score 1001 as the image property measure 1003 departs from the target range 1007. In the example illustrated in FIG. 10, the function is a linear function in the tolerance ranges 1005a-b (e.g., a linear function with a gradual slope). Other functions may be utilized (e.g., exponential functions, logarithmic functions, stepwise functions, etc.). In some approaches, different functions and/or different slope magnitudes may be utilized in different tolerance ranges. In the example illustrated in FIG. 10, tolerance range A 1005a is between threshold A 1009a and threshold B 1009b, the target range 1007 is between threshold B 1009b and threshold C 1009c, and tolerance range B 1005b is between threshold C 1009c and threshold D 1009d.

In the example illustrated in FIG. 10, the image quality parameter score 1001 may be calculated based on the image property measure 1003 in accordance with the following formula (e.g., the following function(s)) given in Equation (2).

$$IQPScore = \begin{cases} 100 - \dfrac{\left(Threshold_C - IPM\right)*30}{Threshold_C * 0.3}, & \text{if } IPM \in [Threshold_D, Threshold_C) \\ 100, & \text{if } IPM \in [Threshold_C, Threshold_B] \\ 100 - \dfrac{\left(IPM - Threshold_B\right)*30}{Threshold_B * 0.3}, & \text{if } IPM \in (Threshold_B, Threshold_A] \\ 0, & \text{Otherwise} \end{cases} \quad (2)$$

In Equation (2), IQPScore is an image quality parameter score 1001, $Threshold_D$ is threshold D 1009d, $Threshold_C$ is threshold C 1009c, $Threshold_B$ is threshold B 1009b, $Threshold_A$ is threshold A 1009a, and IPM is an image property measure 1003 (e.g., a value of a measured property (e.g., SFR value for sharpness, R/G or B/G for color balance and/or white balance, etc.)). In accordance with Equation (2), $Threshold_D = 0.7 * Threshold_C$ and $Threshold_A = 0.3 * Threshold_B$.

Figure 11:
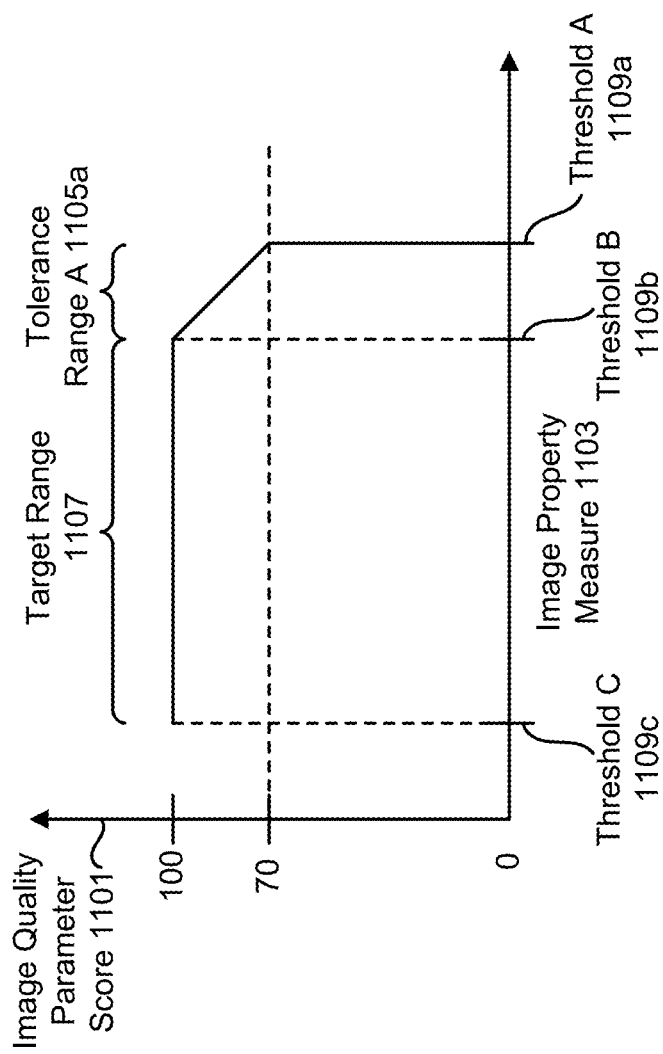
FIG. 11 is a graph illustrating another example of an approach for calculating an image quality parameter score based on an image property measure.

FIG. 11 is a graph illustrating another example of an approach for calculating an image quality parameter score 1101 based on an image property measure 1103. In this example, the image quality parameter score 1101 is illustrated on the vertical axis and the image property measure 1103 is illustrated on the horizontal axis.

In some configurations of the systems and methods disclosed herein, the scoring mechanism may utilize only one low threshold (e.g., and/or only one tolerance range). For example, in certain exposure scenarios (e.g., night street scenes or dark scenes outdoors), it may be appropriate to set only one low threshold (e.g., a minimum threshold). In FIG. 11, the test criteria may be defined as a target range 1107 (between threshold C 1109c and threshold B 1109b, for example). For high scores (e.g., a maximum score), the image property measure 1103 (e.g., value) may fall in the target range 1107.

The graph in FIG. 11 shows a scoring mechanism (e.g., one or more functions), where the test results in a lower image quality parameter score 1101 within tolerance range A 1105a, a high score (e.g., maximum score) if the image property measure 1103 is within the target range 1107, and zero if the image property measure 1103 is outside of the target range 1107 and tolerance range A 1105a. For example, if the image property measure 1103 is within tolerance range A 1105a, the image quality parameter score 1101 may be based on a function that decreases the image quality parameter score 1101 as the image property measure 1103 departs from the target range 1107. In the example illustrated in FIG. 11, the function is a linear function in tolerance range A 1105a (e.g., a linear function with a gradual slope). Other functions may be utilized (e.g., exponential functions, logarithmic functions, stepwise functions, etc.). In the example illustrated in FIG. 11, tolerance range A 1105a is between threshold A 1109a and threshold B 1109b and the target range 1107 is between threshold B 1109b and threshold C 1109c.

In the example illustrated in FIG. 11, the image quality parameter score 1101 may be calculated based on the image property measure 1103 in accordance with the following formula (e.g., the following function(s)) given in Equation (3).

$$IQPScore = \begin{cases} 100 - \dfrac{\left(\dfrac{IPM - }{Threshold_B}\right)*30}{1.3 * Threshold_A}, & \text{if } IPM \in [Threshold_B, Threshold_A) \\ 100, & \text{if } IPM \le Threshold_B \\ 0, & \text{Otherwise} \end{cases} \quad (3)$$

In Equation (3), IQPScore is an image quality parameter score 1101, $Threshold_B$ is threshold B 1109b, $Threshold_A$ is threshold A 1109a, and IPM is an image property measure 1103 (e.g., a value of a measured property (e.g., exposure value, etc.)). In accordance with Equation (3), $Threshold_A = 1.3 * Threshold_B$.

Figure 12:
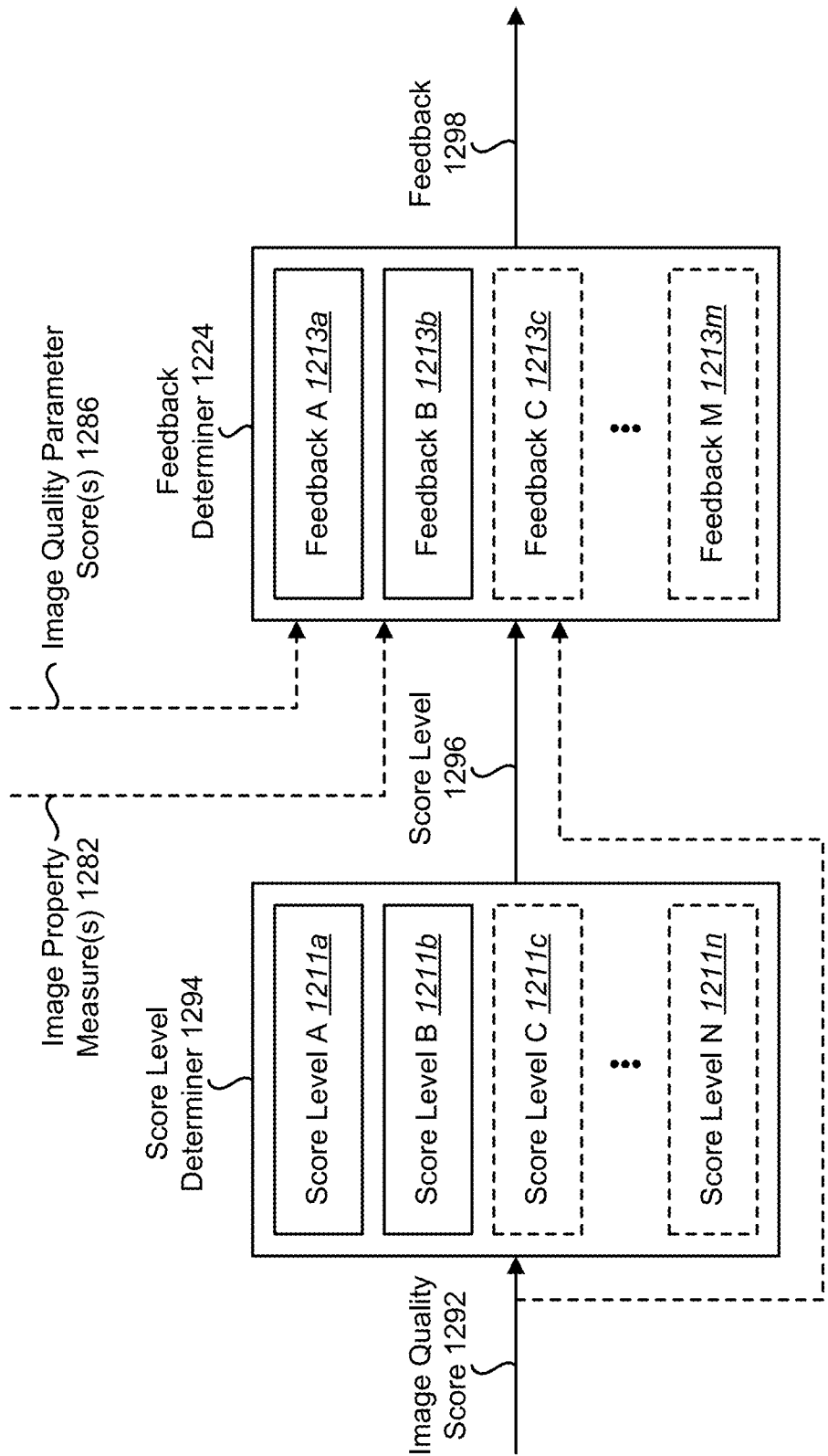
FIG. 12 is a block diagram illustrating an example of a score level determiner and a feedback determiner.

FIG. 12 is a block diagram illustrating an example of a score level determiner 1294 and a feedback determiner 1224. The score level determiner 1294 described in connection with FIG. 12 may be an example of the score level determiner 994 described in connection with FIG. 9. The feedback determiner 1224 described in connection with FIG. 12 may be an example of one or more of the feedback determiners 124, 924 described in connection with one or more of FIGS. 1 and 9. In some configurations, the score level determiner 1294 and/or the feedback determiner 1224 may be implemented in the electronic device 102 described in connection with FIG. 1.

The score level determiner 1294 may determine a score level 1296 based on the image quality score 1292. This may be accomplished as described in connection with one or more of FIGS. 1-2 and 8-9. For example, the score level determiner 1294 may determine the score level 1296 from a set of score levels 1211a-n. For instance, the range of potential image quality scores 1292 may be partitioned into a set of two or more score levels 1211a-n. In some approaches, the score levels 1211a-n may be partitioned with a set of thresholds. For example, some thresholds may include 10, 50, 90, and 100 (for image quality scores ranging from 0-100). For instance, the score level determiner 1294 may determine one of the set of score levels 1211a-n based on whether the image quality score is between 0-9, 10-49, 50-89, 90-99, or is 100.

The feedback determiner 1224 may determine feedback 1298 from a set of feedbacks 1213*a-m*. For example, the feedback determination may be based on the score level 1296, the image quality score 1292, one or more image quality parameter scores 1286, and/or one or more image property measures 1282. For instance, the score level, the image quality score 1292, the image quality parameter score(s) 1286 and/or the image property measure(s) 1282 may correspond to (e.g., may be mapped to) one or more of the set of feedbacks 1213*a-m*.

In some configurations, the set of feedbacks 1213*a-m* may include one or more symbols (e.g., emojis, emoticons, etc.), pictures, images, text strings, sounds (e.g., tones, jingles, alerts, language, speech, etc.), etc. Each of the score level 1296, the image quality score 1292, the image quality parameter score(s) 1286, and/or the image property measure(s) 1282 may correspond to one or more symbols, pictures, images, text strings, sounds, etc. The feedback determiner 1224 may determine (e.g., select) the feedback 1298 from the set of feedbacks 1213*a-m* based on the correspondence (e.g., mapping). In some approaches, one or more of the image quality score 1292, the score level 1296, the image quality parameter score(s) 1286, and/or the image property measure(s) 1282 may additionally or alternatively be provided as feedback 1298. For example, if the score level is L3, where a sharpness image quality parameter score is below a threshold (and/or is a lowest score of the image quality parameter scores 1286), the feedback determiner 1224 may present (e.g., display) a thumbs up emoji (to indicate fair image quality), a waving hand emoji (to indicate blurriness), and "63%" to illustrate the image quality score 1292. In some configurations, the feedback determiner 1224 may also provide a suggestion (e.g., "Steady the camera for better quality") and/or a prompt (e.g., "Change to action mode?" and/or "Ignore sharpness for scoring?").

Figure 13:
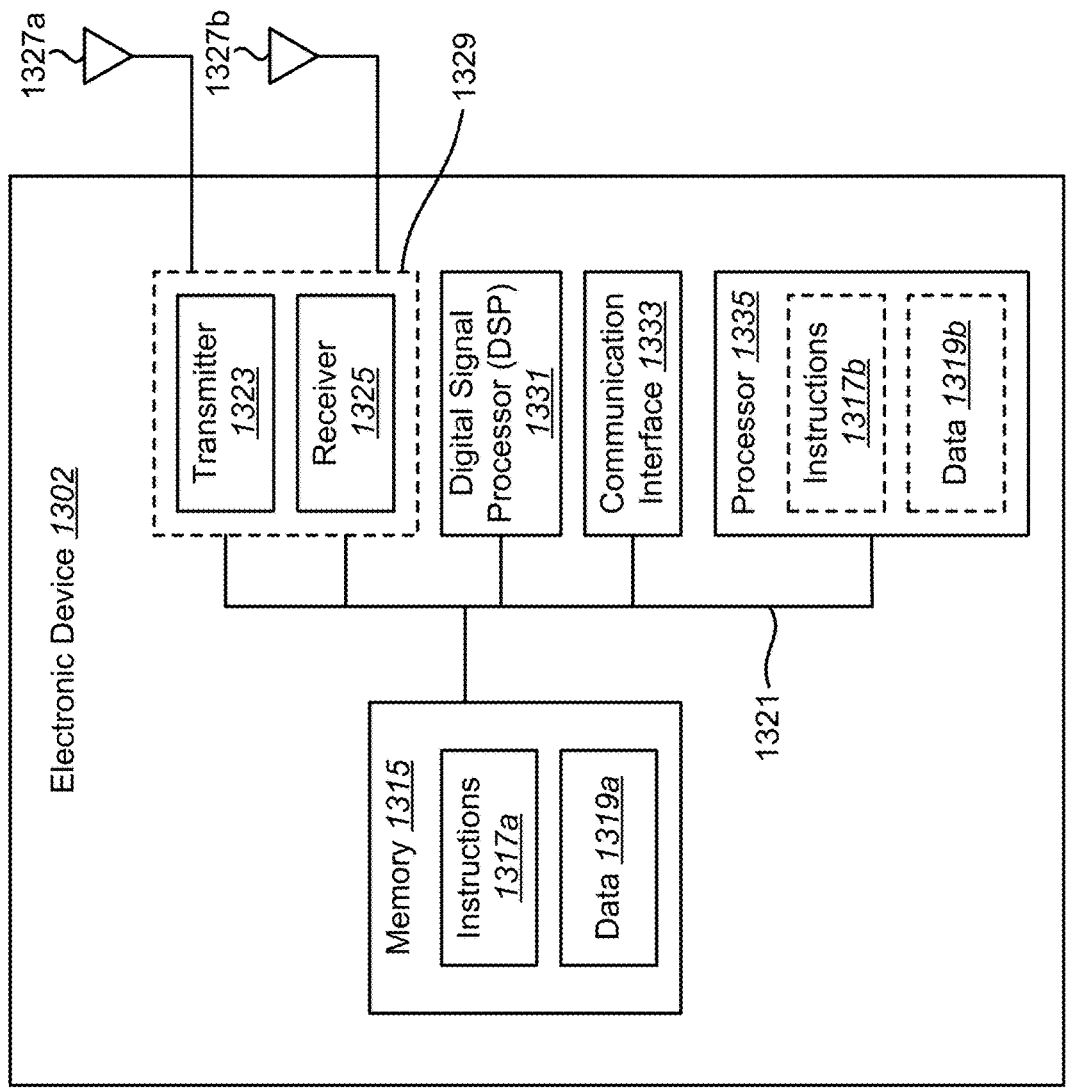
FIG. 13 illustrates certain components that may be included within an electronic device.

FIG. 13 illustrates certain components that may be included within an electronic device 1302. The electronic device 1302 may be an example of and/or may be implemented in accordance with the electronic device 102 described in relation to FIG. 1 in some configurations. The electronic device 1302 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1302 includes a processor 1335. The processor 1335 may be a general purpose single- or multi-chip microprocessor (e.g., an ARM), a special purpose microprocessor (e.g., a digital signal processor (DSP)), a microcontroller, a programmable gate array, etc. The processor 1335 may be referred to as a central processing unit (CPU). Although just a single processor 1335 is shown in the electronic device 1302, in an alternative configuration, a combination of processors (e.g., an ARM and DSP) could be used.

The electronic device 1302 also includes memory 1315. The memory 1315 may be any electronic component capable of storing electronic information. The memory 1315 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1319*a* and instructions 1317*a* may be stored in the memory 1315. The instructions 1317*a* may be executable by the processor 1335 to implement one or more of the methods 200, 700, 800 described herein. Executing the instructions 1317*a* may involve the use of the data 1319*a* that is stored in the memory 1315. When the processor 1335 executes the instructions 1317, various portions of the instructions 1317*b* may be loaded onto the processor 1335, and/or various pieces of data 1319*b* may be loaded onto the processor 1335.

The electronic device 1302 may also include a transmitter 1323 and a receiver 1325 to allow transmission and reception of signals to and from the electronic device 1302. The transmitter 1323 and receiver 1325 may be collectively referred to as a transceiver 1329. One or multiple antennas 1327*a-b* may be electrically coupled to the transceiver 1329. The electronic device 1302 may also include (not shown) multiple transmitters, multiple receivers, multiple transceivers and/or additional antennas.

The electronic device 1302 may include a digital signal processor (DSP) 1331. The electronic device 1302 may also include a communication interface 1333. The communication interface 1333 may enable one or more kinds of input and/or output. For example, the communication interface 1333 may include one or more ports and/or communication devices for linking other devices to the electronic device 1302. Additionally or alternatively, the communication interface 1333 may include one or more other interfaces (e.g., touchscreen, keypad, keyboard, microphone, camera, etc.). For example, the communication interface 1333 may enable a user to interact with the electronic device 1302.

The various components of the electronic device 1302 may be coupled together by one or more buses, which may include a power bus, a control signal bus, a status signal bus, a data bus, etc. For the sake of clarity, the various buses are illustrated in FIG. 13 as a bus system 1321.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
   selecting an image capture mode from a set of modes;
   determining a selected set of image quality parameters and a corresponding set of image quality parameter weights based on the selected image capture mode;
   capturing an image;
   determining an image quality score for the image based on the image quality parameter weights; and
   providing feedback for the image based on the image quality score.

2. The method of claim 1, wherein selecting the image capture mode comprises:
   receiving a mode selection input; and
   selecting a mode from the set of modes based on the mode selection input, wherein the set of modes includes an auto mode, at least one manual mode, and at least one semi-automatic mode.

3. The method of claim 2, wherein determining the image quality parameter weights comprises:
   in a case that the auto mode is selected, selecting a set of equal image quality parameter weights;
   in a case that a semi-automatic mode of the at least one semi-automatic mode is selected, selecting a predetermined set of the image quality parameter weights based on the selected semi-automatic mode; and
   in a case that a manual mode of the at least one manual mode is selected, selecting the image quality parameter weights based on at least one of the selected manual mode or a setting.

4. The method of claim 2, wherein determining the selected set of image quality parameters comprises:
   in a case that the auto mode is selected, selecting all image quality parameters;
   in a case that a semi-automatic mode of the at least one semi-automatic mode is selected, selecting a predetermined set of image quality parameters based on the selected semi-automatic mode; and
   in a case that the manual mode is selected, selecting at least one of the one or more image quality parameters based on at least one of the manual mode or a setting.

5. The method of claim 1, wherein determining the image quality score comprises:
   evaluating one or more image property measures;
   calculating an image quality parameter score for each of the selected set of image quality parameters based on at least one of the one or more image property measures; and
   calculating the image quality score based on each image quality parameter score and the image quality parameter weights.

6. The method of claim 5, wherein calculating the image quality parameter score for each of the selected set image quality parameters comprises, for each of the one or more image property measures:
   determining whether the image property measure is within a target range or a tolerance range; and calculating the image quality parameter score based on whether the image property measure is within the target range or the tolerance range.

7. The method of claim 6, wherein in a case that the image property measure is within the tolerance range, calculating the image quality parameter score is based on a function that decreases the image quality parameter score as the image property measure departs from the target range.

8. The method of claim 1, further comprising determining a score level based on the image quality score.

9. The method of claim 8, wherein determining the score level comprises:
 determining, from a set of ranges, a range that includes the image quality score; and
 providing the score level corresponding to the determined range.

10. The method of claim 1, wherein providing the feedback comprises:
 determining, from a set of feedbacks, the feedback corresponding to the image quality score; and
 providing the feedback while the electronic device is enabled for image capture.

11. An electronic device, comprising:
 a memory;
 a processor coupled to the memory, wherein the processor is configured to:
  select an image capture mode from a set of modes;
  determine a selected set of image quality parameters and a corresponding set of image quality parameter weights based on the selected image capture mode;
  capture an image;
  determine an image quality score for the image based on the one or more image quality parameter weights; and
  provide feedback for the image based on the image quality score.

12. The electronic device of claim 11, wherein the processor is configured to select the image capture mode by:
 receiving a mode selection input; and
 selecting a mode from the set of modes based on the mode selection input, wherein the set of modes includes an auto mode, at least one manual mode, and at least one semi-automatic mode.

13. The electronic device of claim 12, wherein the processor is configured to determine the image quality parameter weights by:
 in a case that the auto mode is selected, selecting a set of equal image quality parameter weights;
 in a case that a semi-automatic mode of the at least one semi-automatic mode is selected, selecting a predetermined set of the image quality parameter weights based on the selected semi-automatic mode; and
 in a case that a manual mode of the at least one manual mode is selected, selecting the image quality parameter weights based on at least one of the selected manual mode or a setting.

14. The electronic device of claim 12, wherein the processor is configured to determine the selected set of image quality parameters by:
 in a case that the auto mode is selected, selecting all image quality parameters;
 in a case that a semi-automatic mode of the at least one semi-automatic mode is selected, selecting a predetermined set of image quality parameters based on the selected semi-automatic mode; and in a case that the manual mode is selected, selecting at least one of the one or more image quality parameters based on at least one of the manual mode or a setting.

15. The electronic device of claim 11, wherein the processor is configured to determine the image quality score by:
 evaluating one or more image property measures;
 calculating an image quality parameter score for each of the selected set of image quality parameters based on at least one of the one or more image property measures; and
 calculating the image quality score based on each image quality parameter score and the image quality parameter weights.

16. The electronic device of claim 15, wherein the processor is configured to calculate the image quality parameter score for each of the selected set of image quality parameters by, for each of the one or more image property measures:
 determining whether the image property measure is within a target range or a tolerance range; and
 calculating the image quality parameter score based on whether the image property measure is within the target range or the tolerance range.

17. The electronic device of claim 16, wherein the processor is configured to, in a case that the image property measure is within the tolerance range, calculate the image quality parameter score based on a function that decreases the image quality parameter score as the image property measure departs from the target range.

18. The electronic device of claim 11, wherein the processor is further configured to determine a score level based on the image quality score.

19. The electronic device of claim 18, wherein the processor is configured to determine the score level by:
 determining, from a set of ranges, a range that includes the image quality score; and
 providing the score level corresponding to the determined range.

20. The electronic device of claim 11, wherein the processor is configured to provide the feedback by:
 determining, from a set of feedbacks, the feedback corresponding to the image quality score; and
 providing the feedback while the electronic device is enabled for image capture.

21. A non-transitory tangible computer-readable medium storing computer executable code, comprising:
 code for causing an electronic device to select an image capture mode from a set of modes;
 code for causing the electronic device to determine a selected set of image quality parameters and a corresponding set of image quality parameter weights based on the selected image capture mode;
 code for causing the electronic device to capture an image;
 code for causing the electronic device to determine an image quality score for the image based on the image quality parameter weights; and
 code for causing the electronic device to provide feedback for the image based on the image quality score.

22. The computer-readable medium of claim 21, wherein the code for causing the electronic device to select the image capture mode comprises:
 code for causing the electronic device to receive a mode selection input; and
 code for causing the electronic device to select a mode from the set of modes based on the mode selection input, wherein the set of modes includes an auto mode, at least one manual mode, and at least one semi-automatic mode.

23. The computer-readable medium of claim 22, wherein the code for causing the electronic device to determine the image quality parameter weights comprises:
   code for causing the electronic device to, in a case that the auto mode is selected, select a set of equal image quality parameter weights;
   code for causing the electronic device to, in a case that a semi-automatic mode of the at least one semi-automatic mode is selected, select a predetermined set of the image quality parameter weights based on the selected semi-automatic mode; and
   code for causing the electronic device to, in a case that a manual mode of the at least one manual mode is selected, select the image quality parameter weights based on at least one of the selected manual mode or a setting.

24. The computer-readable medium of claim 21, wherein the code for causing the electronic device to determine the image quality score comprises:
   code for causing the electronic device to evaluate one or more image property measures;
   code for causing the electronic device to calculate an image quality parameter score for each of the selected set of image quality parameters based on at least one of the one or more image property measures; and
   code for causing the electronic device to calculate the image quality score based on each image quality parameter score and the image quality parameter weights.

25. The computer-readable medium of claim 21, further comprising code for causing the electronic device to determine a score level based on the image quality score.

26. An apparatus, comprising:
   means for selecting an image capture mode from a set of modes;
   means for determining a selected set of image quality parameters and a corresponding set of image quality parameter weights based on the selected image capture mode;
   means for capturing an image;
   means for determining an image quality score for the image based on the image quality parameter weights; and
   means for providing feedback for the image based on the image quality score.

27. The apparatus of claim 26, wherein the means for selecting the image capture mode comprises:
   means for receiving a mode selection input; and
   means for selecting a mode from the set of modes based on the mode selection input, wherein the set of modes includes an auto mode, at least one manual mode, and at least one semi-automatic mode.

28. The apparatus of claim 27, wherein the means for determining the image quality parameter weights comprises:
   means for, in a case that the auto mode is selected, selecting a set of equal image quality parameter weights;
   means for, in a case that a semi-automatic mode of the at least one semi-automatic mode is selected, selecting a predetermined set of the image quality parameter weights based on the selected semi-automatic mode; and
   means for, in a case that a manual mode of the at least one manual mode is selected, selecting the image quality parameter weights based on at least one of the selected manual mode or a setting.

29. The apparatus of claim 26, wherein the means for determining the image quality score comprises:
   means for evaluating one or more image property measures;
   means for calculating an image quality parameter score for each of the selected set of image quality parameters based on at least one of the one or more image property measures; and
   means for calculating the image quality score based on each image quality parameter score and the image quality parameter weights.

30. The apparatus of claim 26, further comprising means for determining a score level based on the image quality score.

* * * * *